United States Patent
Ohnishi et al.

(10) Patent No.: US 8,570,427 B2
(45) Date of Patent: Oct. 29, 2013

(54) IMAGE-CAPTURING DEVICE HAVING FOCUS ADJUSTMENT FUNCTION, IMAGE CREATION METHOD INCLUDING FOCUS ADJUSTMENT FUNCTION, AND PROGRAM PRODUCT FOR IMAGE-CAPTURING DEVICE HAVING FOCUS ADJUSTMENT FUNCTION

(75) Inventors: Naoyuki Ohnishi, Tokyo (JP); Noeru Takemura, Tokyo (JP)

(73) Assignee: Nikon Corporation, Tokyo (JP)

( * ) Notice: Subject to any disclaimer, the term of this patent is extended or adjusted under 35 U.S.C. 154(b) by 487 days.

(21) Appl. No.: 12/692,869

(22) Filed: Jan. 25, 2010

(65) Prior Publication Data

US 2010/0188522 A1 Jul. 29, 2010

(30) Foreign Application Priority Data

Jan. 28, 2009 (JP) .................................. 2009-016481
Feb. 20, 2009 (JP) .................................. 2009-038108

(51) Int. Cl.
*H04N 5/232* (2006.01)

(52) U.S. Cl.
USPC .......................................... 348/345; 348/349

(58) Field of Classification Search
USPC ................... 348/345–348, 335–340
See application file for complete search history.

(56) References Cited

U.S. PATENT DOCUMENTS

| | | | | |
|---|---|---|---|---|
| 4,687,917 A * | 8/1987 | Kusaka et al. | ............. | 250/201.8 |
| 5,243,375 A * | 9/1993 | Ishida et al. | ................... | 396/123 |
| 5,485,002 A * | 1/1996 | Kusaka | ...................... | 250/201.8 |
| 5,508,506 A * | 4/1996 | Kusaka | ...................... | 250/201.8 |
| 5,525,792 A * | 6/1996 | Kusaka | ...................... | 250/201.8 |
| 5,563,678 A * | 10/1996 | Kusaka | ........................... | 396/121 |
| 5,572,282 A * | 11/1996 | Uchiyama | ...................... | 396/125 |
| 6,750,437 B2 * | 6/2004 | Yamashita et al. | .......... | 250/208.1 |
| 6,819,360 B1 * | 11/2004 | Ide et al. | ....................... | 348/340 |
| 6,933,978 B1 * | 8/2005 | Suda | ............................. | 348/345 |

(Continued)

FOREIGN PATENT DOCUMENTS

| JP | A-9-127405 | 5/1997 |
|---|---|---|
| JP | A-2001-330882 | 11/2001 |

(Continued)

OTHER PUBLICATIONS

Japanese Office Action dated Nov. 30, 2010 in Japanese Patent Application No. 2009-016481 (with translation).
Office Action dated Oct. 26, 2010 in Japanese Patent Application No. 2009.038108 (with translation).
Nov. 13, 2012 Office Action issued in Japanese Patent Application No. 2011-017772 (with translation).

*Primary Examiner* — Sinh Tran
*Assistant Examiner* — Selam Gebriel
(74) *Attorney, Agent, or Firm* — Oliff and Berridge, PLC

(57) ABSTRACT

An image-capturing device includes: a micro-lens array in which a plurality of micro lenses are arrayed; a light reception element array having a plurality of groups of light reception elements respectively corresponding to the plurality of micro lenses, and that receives a ray bundle from an optical system via the micro lenses and outputs a plurality of received light signals; a detection unit that detects a deviation amount of an image surface by the optical system when the received light signals were obtained; and an image creation unit that selects a portion of the plurality of received light signals on the basis of the deviation amount detected by the detection unit, and creates an image on the basis of that selected portion of the received light signals.

14 Claims, 12 Drawing Sheets

13: LENS DRIVE CONTROL UNIT
18M: BUFFER MEMORY
17: IMAGE CREATION UNIT
12: LENS DRIVE AMOUNT CALCULATION UNIT
11: FOCUS DETECTION CALCULATION UNIT
10: FOCUS DETECTION REGION SETTING UNIT
9: PHOTOGRAPHIC SUBJECT RECOGNITION UNIT
8: SENSOR CONTROL UNIT

(56) References Cited

U.S. PATENT DOCUMENTS

| | | | |
|---|---|---|---|
| 7,488,923 B2* | 2/2009 | Kusaka | 250/201.2 |
| 2003/0011693 A1* | 1/2003 | Oda | 348/272 |
| 2004/0179128 A1* | 9/2004 | Oikawa | 348/345 |
| 2007/0102619 A1* | 5/2007 | Kusaka | 250/201.2 |
| 2007/0206940 A1* | 9/2007 | Kusaka | 396/128 |
| 2008/0193026 A1 | 8/2008 | Horie et al. | |
| 2008/0205871 A1* | 8/2008 | Utagawa | 396/125 |
| 2009/0140131 A1 | 6/2009 | Utagawa | |
| 2009/0174807 A1* | 7/2009 | Utagawa | 348/345 |
| 2009/0185798 A1* | 7/2009 | Tsukada | 396/123 |
| 2011/0298963 A1* | 12/2011 | Kato et al. | 348/345 |

FOREIGN PATENT DOCUMENTS

| | | |
|---|---|---|
| JP | A-2003-209727 | 7/2003 |
| JP | A-2007-004471 | 1/2007 |
| JP | A-2007-4471 | 1/2007 |
| JP | A-2007-74079 | 3/2007 |
| JP | A-2008-116616 | 5/2008 |
| JP | A-2008-515110 | 5/2008 |
| JP | A-2008-219878 | 9/2008 |
| JP | A-2008-294741 | 12/2008 |
| WO | WO 2006/039486 A2 | 4/2006 |

* cited by examiner

13: LENS DRIVE CONTROL UNIT
18M: BUFFER MEMORY
17: IMAGE CREATION UNIT
12: LENS DRIVE AMOUNT CALCULATION UNIT
11: FOCUS DETECTION CALCULATION UNIT
10: FOCUS DETECTION REGION SETTING UNIT
9: PHOTOGRAPHIC SUBJECT RECOGNITION UNIT
8: SENSOR CONTROL UNIT

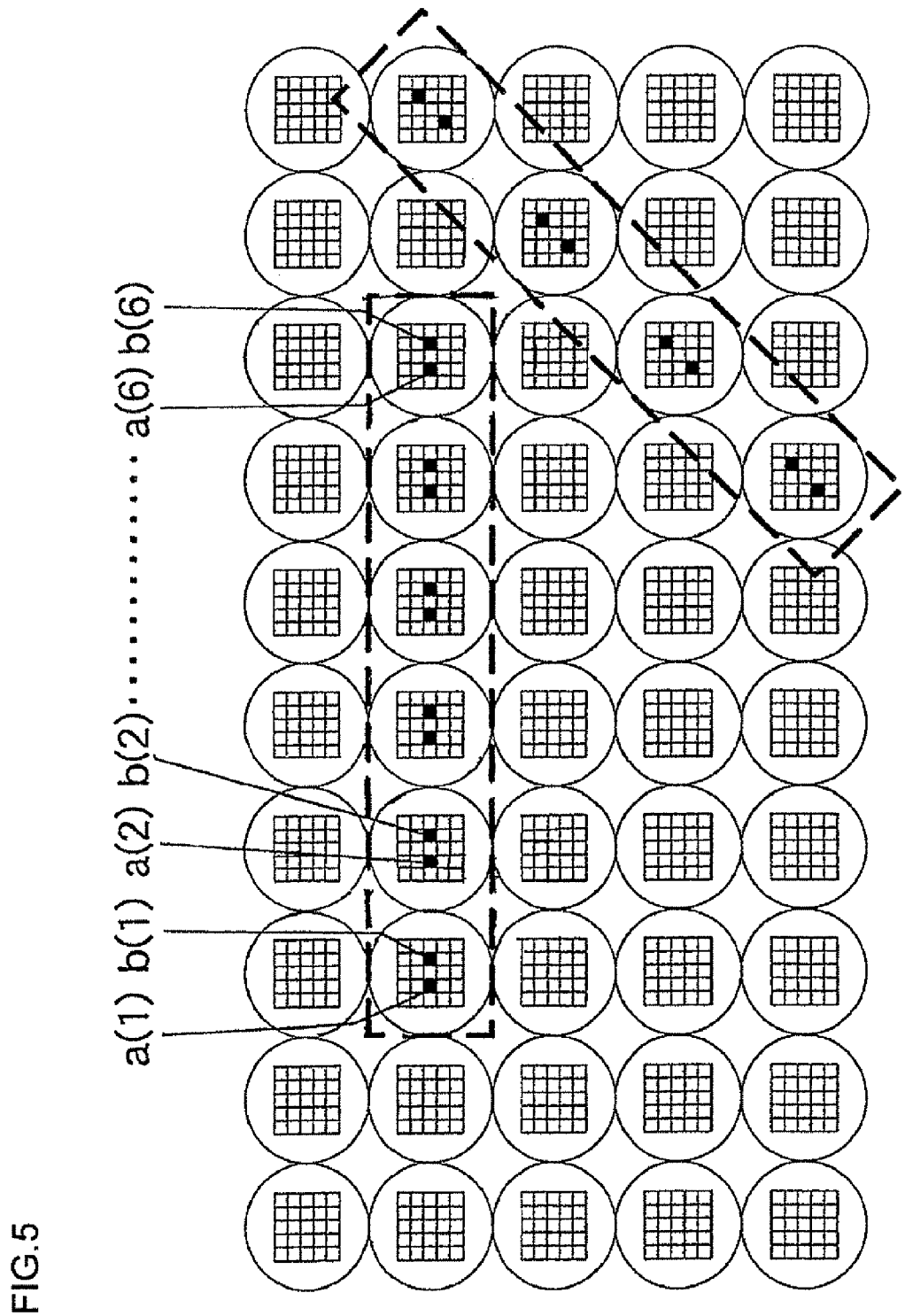

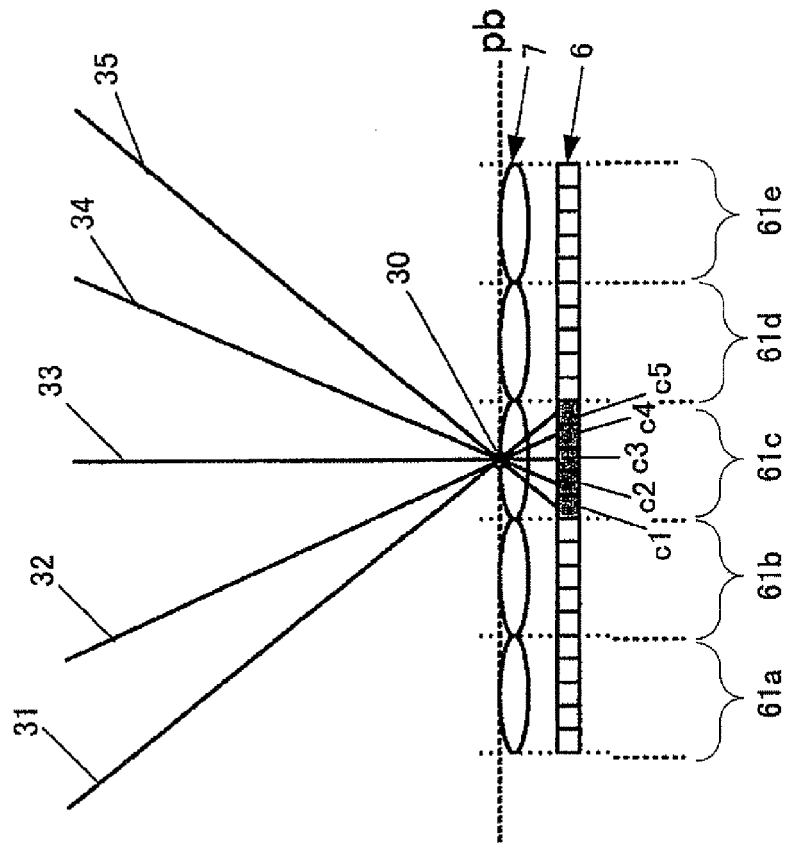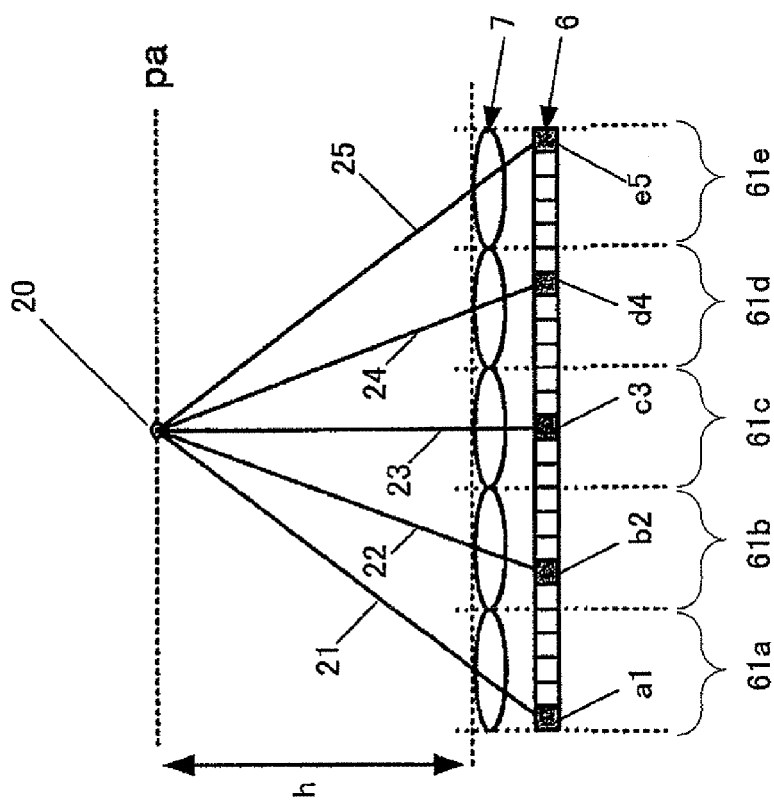

IMAGE-CAPTURING DEVICE HAVING FOCUS ADJUSTMENT FUNCTION, IMAGE CREATION METHOD INCLUDING FOCUS ADJUSTMENT FUNCTION, AND PROGRAM PRODUCT FOR IMAGE-CAPTURING DEVICE HAVING FOCUS ADJUSTMENT FUNCTION

INCORPORATION BY REFERENCE

The disclosures of the following priority applications are herein incorporated by reference: Japanese Patent Application No. 2009-16481 filed Jan. 28, 2009 and Japanese Patent Application No. 2009-38108 filed Feb. 20, 2009.

BACKGROUND OF THE INVENTION

1. Field of the Invention

The present invention relates to an image-capturing device, to an image creation method, and to a program product.

2. Description of Related Art

An image combination technique is disclosed in Japanese Laid-Open Patent Publication No. 2007-4471 for synthesizing, from data obtained by taking a single photograph, an image at an image surface focused upon a photographic subject at any desired distance.

However, there has been no proposal for how the technique described above may be applied to an image-capturing device in a concrete manner.

SUMMARY OF THE INVENTION

An image-capturing device according to a 1st aspect of the present invention comprises: a micro-lens array in which a plurality of micro lenses are arrayed; a light reception element array having a plurality of groups of light reception elements respectively corresponding to the plurality of micro lenses, and that receives a ray bundle from an optical system via the micro lenses and outputs a plurality of received light signals; a detection unit that detects a deviation amount of an image surface by the optical system when the received light signals were obtained; and an image creation unit that selects a portion of the plurality of received light signals on the basis of the deviation amount detected by the detection unit, and creates an image on the basis of that selected portion of the received light signals.

According to a 2nd aspect of the present invention, the image-capturing device of the 1st aspect may further comprise a specification unit that specifies a position of a subject for detection of the deviation amount by the detection unit, within the image surface by the optical system. In this image-capturing device, it is preferred that the image creation unit selects the portion of the plurality of received light signals on the basis of the deviation amount of the image surface at the position specified by the specification unit.

According to a 3rd aspect of the present invention, in the image-capturing device of the 2nd aspect, the specification unit may comprise a recognition unit that recognizes a specified image in the image formed by the optical system, and the detection unit may detect the deviation amount of the image surface at the position of the image recognized by the recognition unit.

According to a 4th aspect of the present invention, in the image-capturing device of the 3rd aspect, it is desirable that the recognition unit subdivides the image surface by the optical system into a plurality of regions, on the basis of the specified image that has been recognized, and that the detection unit detects the deviation amounts of the image surface for these regions subdivided by the recognition unit.

According to a 5th aspect of the present invention, in the image-capturing device of the 4th aspect, if the size of any one of the regions subdivided by the recognition unit is greater than a predetermined proportion of the image surface, the detection unit may detect a plurality of deviation amounts of the image surface in that region.

According to a 6th aspect of the present invention, in the image-capturing device of any one of the 1st through 5th aspects, it is acceptable that the detection unit detects the deviation amount of the image surface at a position in the image created by the optical system on the basis of the received light signals at which the contrast is greater than a predetermined value.

According to a 7th aspect of the present invention, the image-capturing device of any one of the 1st through 6th aspects may further comprise a focus adjustment unit that performs focus adjustment of the optical system on the basis of the deviation amount at the image surface detected by the detection unit. In this image-capturing device, it is preferred that the image creation unit creates the image on the basis of the received light signals outputted by the light reception element array that has received a ray bundle from the optical system for which focus adjustment has been performed by the focus adjustment unit.

According to an 8th aspect of the present invention, in the image-capturing device of the 7th aspect, the focus adjustment unit may perform focus adjustment of the optical system when the deviation amount exceeds some predetermined value.

According to a 9th aspect of the present invention, the image-capturing device of any one of the 1st through 8th aspects may further comprise: an initial image creation unit that creates an initial image on the basis of a portion of the plurality of received light signals; and a selection unit that selects an image of a specified subject from the initial image. In this image-capturing device, it is preferred that the detection unit detects, in the initial image, the deviation amount of the image surface at the position of the image of the specified subject.

According to a 10th aspect of the present invention, in the image-capturing device of any one of the 1st through 9th aspects, the detection unit can detect the deviation amount on the basis of the plurality of received light signals.

According to an 11th aspect of the present invention, in the image-capturing device of any one of the 1st through 10th aspects, it is desirable that the image creation unit determines a selection range when selecting a portion of the received light signals on the basis of the deviation amount, according to the aperture value of the optical system.

According to a 12th aspect of the present invention, in the image-capturing device of any one of the 1st through 11th aspects, it is preferred that the light reception element array outputs the plurality of received light signals in a state in which the optical system is set to fully opened aperture.

According to a 13th aspect of the present invention, in the image-capturing device of the 9th aspect, the initial image creation unit can create the initial image on the basis of the received light signals from light reception elements that are positioned at the approximate centers of the groups of light reception elements that respectively correspond to the plurality of micro lenses.

According to a 14th aspect of the present invention, in the image-capturing device of the 9th or 13th aspect, the detection unit may determine a position for detection of the deviation amount, on the basis of at least one of the position and the size of an image included in the initial image.

According to a 15th aspect of the present invention, in the image-capturing device of the 14th aspect, it is preferred that the detection unit determines a position and size priority order for the image, according to the type of photographic mode.

According to a 16th aspect of the present invention, the image-capturing device of any one of the 1st through 15th aspects may further comprise a recording control unit that records image data synthesized by the image creation unit upon a recording medium. In this image-capturing device, the recording control unit can record data for a plurality of images synthesized by the image creation unit on the basis of the plurality of received light signals outputted repeatedly by the light reception element array, on the recording medium as a video image.

An image creation method according to a 17th aspect of the present invention comprises: obtaining a plurality of received light signals by receiving a ray bundle from an optical system with a plurality of groups of light reception elements arranged so as respectively to correspond to a plurality of micro lenses; detecting a deviation amount of an image surface by the optical system when the received light signals were obtained; selecting a portion of the plurality of received light signals on the basis of the detected deviation amount of the image surface; and creating an image on the basis of that selected portion of the received light signals.

A computer-readable program product according to an 18th aspect of the present invention causes a computer to execute: a step of inputting information for a plurality of received light signals obtained by receiving a ray bundle from an optical system with a plurality of groups of light reception elements arranged so as respectively to correspond to a plurality of micro lenses; a step of inputting information for a deviation amount of an image surface by the optical system detected when the received light signals were obtained; a step of selecting a portion of the plurality of received light signals on the basis of the detected deviation amount; and a step of creating an image on the basis of the selected portion of the received light signals.

According to the present invention, after photography, when synthesizing from the photographic data an image at an image surface focused upon a photographic subject at a desired distance, it is possible rapidly to set the image surface that is to be taken as the subject for image synthesis. Moreover it is possible to obtain an image focused upon any desired photographic subject in a simple and easy manner, on the basis of the data in a single captured image.

BRIEF DESCRIPTION OF THE DRAWINGS

FIG. 5 is another figure for explanation of a method of detecting defocus amount;

FIG. 6A is a figure for explanation of a method of synthetically capturing an image focused at an image surface pa, for which the amount of deviation from the surface of image formation by a lens optical system is h;

FIG. 6B is a figure for explanation of a method of synthetically capturing an image focused at an image surface pb, for which the amount of deviation from the surface of image formation by the lens optical system is 0;

DESCRIPTION OF THE PREFERRED EMBODIMENTS

Embodiment One

Figure 1:
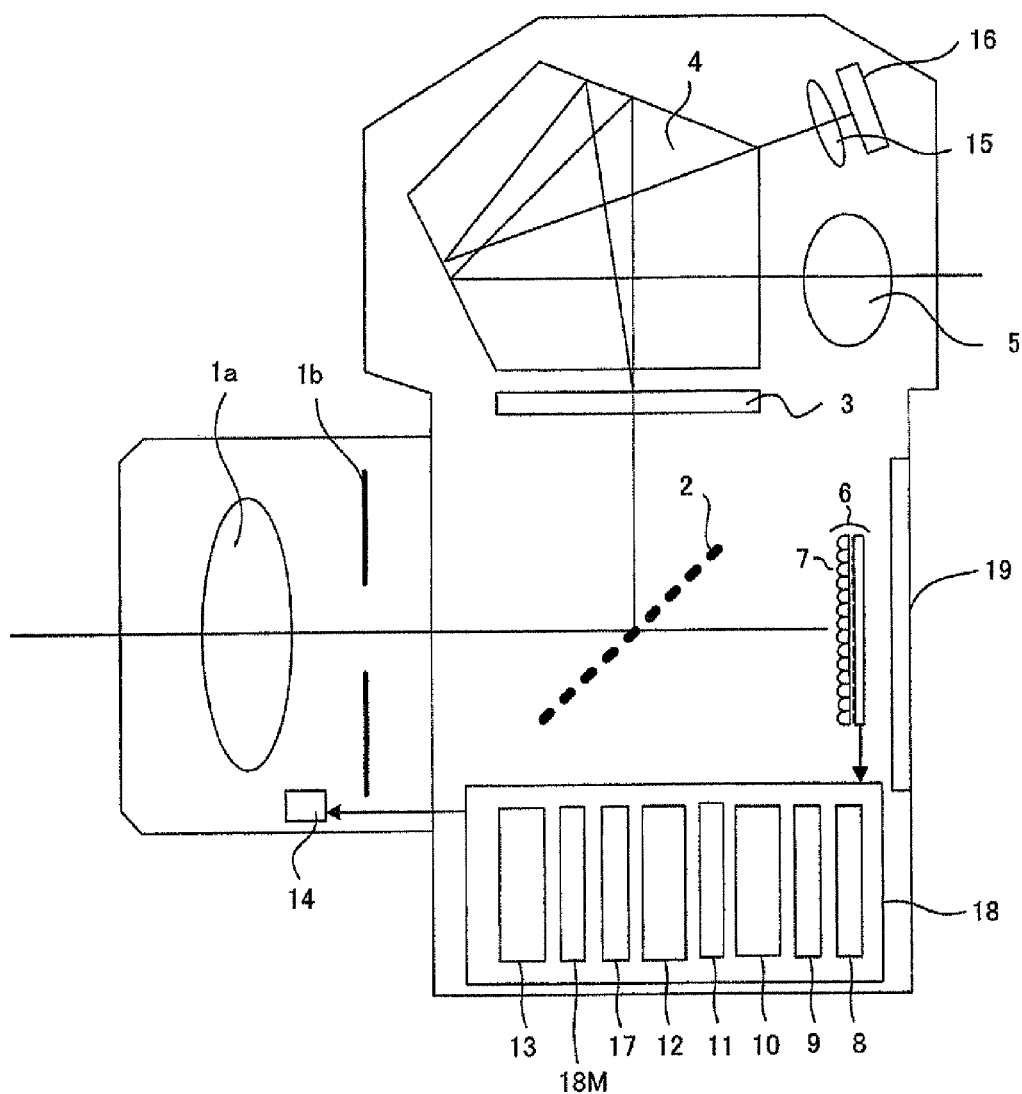
FIG. 1 is a block diagram showing the structure of the principal portions of a digital camera that is an embodiment of the present invention.

Now, various ways in which the present invention may be implemented will be explained with reference to the appended drawings. FIG. 1 is a block diagram showing the structure of the principal portions of a digital camera according to a first embodiment of the present invention. This digital camera is a single lens reflex type camera, and its lens barrel is installed to its body in an interchangeable manner. The lens barrel includes a photographic optical system 1a, an aperture 1b, and a lens drive motor 14. The photographic optical system 1a is an optical system for imaging an image of a photographic subject at a focusing surface, and includes a plurality of lenses that include a focus adjustment lens. This focus adjustment lens shifts forwards and backwards along the direction of the optical axis, due to the operation of the lens drive motor 14. And the aperture 1b limits the ray bundle that passes through the photographic optical system 1a.

In the interior of the body of this digital camera there are provided: a half mirror 2, a viewfinder screen 3, a pentaprism 4, an eyepiece lens 5, an imaging element 6 that includes a micro lens array 7 and a light reception element, a sensor control unit 8, a photographic subject recognition unit 9, a focus detection region setting unit 10, a focus detection calculation unit 11, a lens drive amount calculation unit 12, a lens drive control unit 13, a lens for photometry 15, a photometric sensor 16, an image creation unit 17, a control device 18, and a buffer memory 18M.

Furthermore, a display unit 19 is provided upon the rear surface of the digital camera body. It should be understood that the sensor control unit 8, the photographic subject recognition unit 9, the focus detection region setting unit 10, the focus detection calculation unit 11, the lens drive amount calculation unit 12, the lens drive control unit 13, the buffer memory 18M, and the image creation unit 17 are implemented as functions of the control device 18.

The imaging element 6 is a light reception element array that includes a plurality of light reception elements (i.e. photoelectric conversion elements) that receive the ray bundle from the photographic optical system 1a via the micro lens array 7; this imaging element 6 may include, for example, a CCD image sensor or a CMOS image sensor or the like. Moreover, a color filter (not shown in the figures) is provided upon the image-capturing surface of the imaging element 6, in which red (R), green (G), and blue (B) filter elements that pass only light of those colors are arranged in a predetermined array pattern. As color information and luminance information for the ray bundle, by receiving the ray bundle that has passed through the photographic optical system 1a and the aperture 1b upon the light reception elements, via the above described micro lens array 7 and color filter, the imaging element 6 outputs a received light signal that is obtained by capturing an image of the photographic subject imaged by the photographic optical system 1a.

This received light signal that is outputted from the imaging element 6 is converted by the control device 18 into image data. Due to this, a captured image is acquired by the digital camera. It should be understood that an infrared cutoff filter for intercepting infrared radiation, a low pass optical filter for aliasing noise of the image, and the like (not shown in the figures) may also be provided upon the image-capturing surface of the imaging element 6.

The micro lens array 7 includes a plurality of micro lenses arranged in a two dimensional array, and the image formed by the photographic optical system 1a is imaged upon the micro lens array 7. Moreover, the ray bundle that has passed through the photographic optical system 1a is incident upon the light reception element via the micro lenses. It should be understood that the light reception element is almost conjugate to the pupil of the photographic optical system 1a with respect to the micro lenses.

Figure 2:
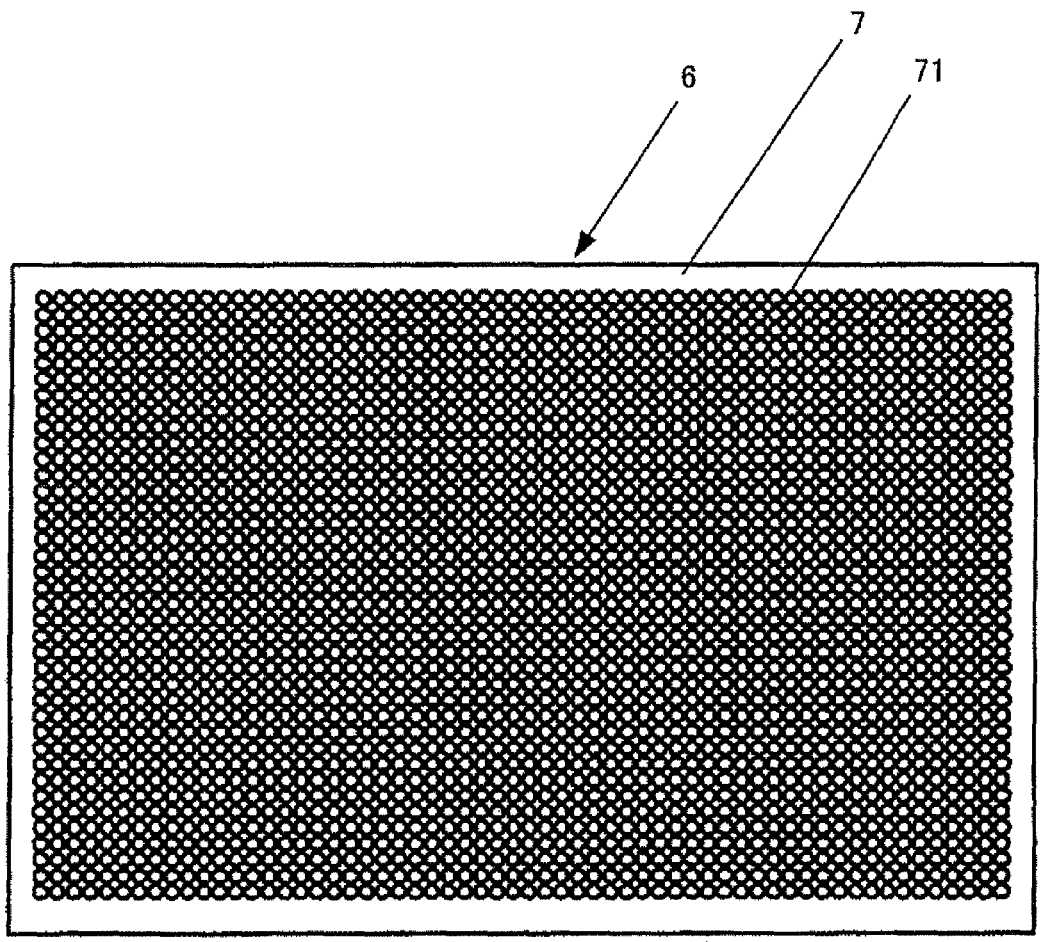
FIG. 2 is a figure showing an image-capturing surface of an imaging element.
Figure 3:
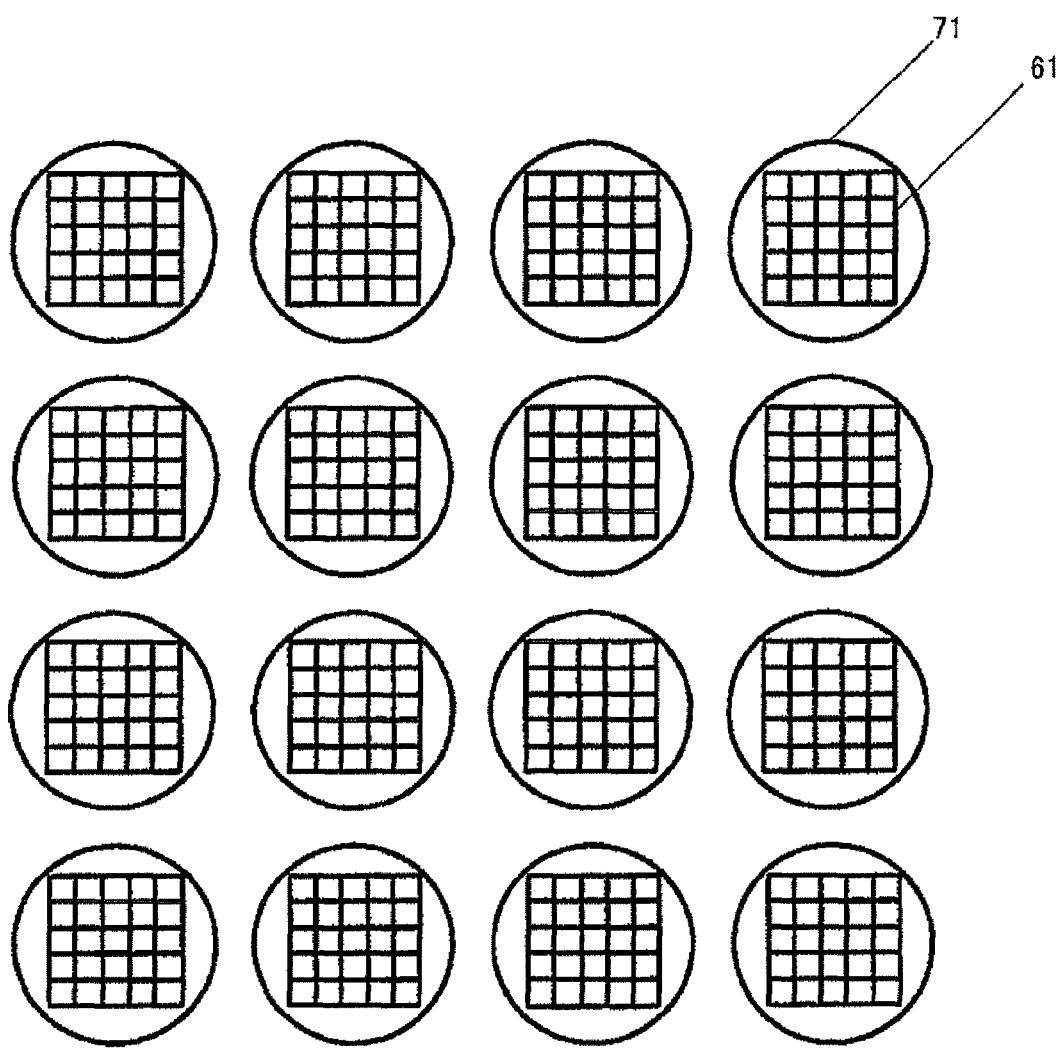
FIG. 3 is a figure showing a portion of FIG. 2 as enlarged.

FIG. 2 is a figure showing the image-capturing surface of the imaging element 6. As shown in FIG. 2, the plurality of micro lenses 71 of the micro lens array 7 are arrayed in a two dimensional arrangement over the effective pixel range of the imaging element 6. FIG. 3 is a figure showing a portion of FIG. 2 as enlarged. As shown in FIG. 3, a plurality of light reception elements 61 are provided for a single one of the micro lenses 71. The plurality of light reception elements 61 that correspond to the single micro lens 71 constitute a single pixel region upon the imaging element 6. With this structure, the imaging element 6 receives the ray bundle from the photographic optical system 1a via the micro lenses 71, and outputs a plurality of received light signals corresponding to the light reception elements 61.

In this embodiment, upon image capture information being acquired on the basis of the light signal received from the imaging element 6, calculation of a defocus amount that will be described hereinafter is performed. It should be understood that while in FIG. 3 an example is shown in which a total of 25 light reception elements 61 (arranged 5 vertically by 5 horizontally) correspond to each one of the micro lenses 71, this specific structure is only shown by way of example, and is not to be considered as being particularly limitative of the number of light reception elements 61 that correspond to a single micro lens 71.

A half mirror 2 is disposed between the photographic optical system 1a of FIG. 1 and the imaging element 6, so that the ray bundle from the photographic subject that has passed through the photographic optical system 1a is divided, part thereof proceeding to a viewfinder optical system and part proceeding to the imaging element 6. Thus, one portion of the photographic subject ray bundle passes through the half mirror 2 to the imaging element 6, while the other portion of the photographic subject ray bundle does not pass through the half mirror 2, but rather is reflected upwards by the half mirror 2.

The photographic subject ray bundle that has thus been reflected by the half mirror 2 images an image of the photographic subject upon the viewfinder screen 3, that is provided at a position optically equivalent to the imaging element 6. This photographic subject image formed upon the viewfinder screen 3 is conducted to the eye of the photographer via the pentaprism 4 and the eyepiece lens 5, and can be checked visually by the photographer.

Furthermore, this photographic subject image formed upon the viewfinder screen 3 is conducted to the photometric sensor 16 via the pentaprism 4 and the lens for photometry 15. This photometric sensor 16 is provided with a plurality of light reception elements that receive light via a color filter (not shown in the figures) in which red (R), green (G), and blue (B) filter elements that pass only light of those colors are arranged. And the photometric sensor 16 outputs the received light signals obtained from these light reception elements to the control device 18, as color information and luminance information for the photographic subject image. On the basis of these received light signals from the photometric sensor 16, the control device 18 detects the brightness at the focused image surface.

With the digital camera of this first embodiment as described above, the color information and the luminance information that correspond to a total of 25 light reception elements 61 (5 vertically by 5 horizontally) constituting a single pixel region upon the imaging element 6, are handled as image capture information for that one pixel region. In other words, the image capture information acquired by the digital camera of this first embodiment includes a plurality of items of light reception information for each single pixel region. With the digital camera of this first embodiment, the image capture information acquired in this manner is acquired during photography, and is recorded upon a recording medium such as a memory card or the like, not shown in the figures. By performing image synthesis processing as will be described hereinafter on the basis of this image capture information, it is possible to synthesize an image that is focused at an image surface at any desired position (i.e. at any desired distance from the micro lens array 7).

The sensor control unit 8 controls the amount of gain and the time period of accumulation of the imaging element 6 according to the conditions under which the digital camera is operating, and reads out the received light signals outputted from the light reception elements of the imaging element 6. The received light signals read out by the sensor control unit 8 are converted into digital signals by analog to digital conversion processing. And the received light signals that have thus been converted to digital form are temporarily stored in the buffer memory 18M. These received light signals in the buffer memory 18M are not only outputted to the photographic subject recognition unit 9 and the focus detection calculation unit 11 to be used for detection of a defocus amount as will be described hereinafter, but also are outputted to the image creation unit 17 and are subjected to predetermined image processing.

On the basis of the received light signals after digital conversion stored in the buffer memory 18M, in the image created by the photographic optical system 1a, the photographic subject recognition unit 9 recognizes one or more specific images as being photographic subjects, and specifies the position (position upon the screen), the number, the size (i.e. the number of pixels constituting the image) and so on of each photographic subject that has been recognized. Furthermore, the recognition unit 9 specifies one among these recognized photographic subjects as being the main photographic subject. When photography is performed with the digital camera of this first embodiment, the results of this photographic subject recognition are recorded upon the recording medium in correspondence with the image capture information described above, as a portion of the photographic subject information that describes the state of the photographic subject during photography. One method that can be employed for this photographic subject recognition is to utilize a technique of template matching or the like, in which the degree of resemblance (similarity) to template images that have been registered in advance is calculated, and an image region whose degree of similarity is greater than a predetermined value is detected as being a position of a photographic subject.

On the basis of the results of photographic subject recognition by the photographic subject recognition unit 9, the focus detection region setting unit 10 sets one or more focus detection regions (focus detection positions) within the image surface, that will be taken as subjects for defocus amount detection by the focus detection calculation unit 11. Any number of these focus detection regions of any sizes may be set, at any positions within the image surface. The concrete method by which the focus detection regions are set by the focus detection region setting unit 10 will be described hereinafter.

For each focus detection region set by the focus detection region setting unit 10, the focus detection calculation unit 11 detects a defocus amount that specifies the focal adjustment state of the photographic optical system 1*a*, on the basis of those received light signals, among the received light signals in the buffer memory 18M, that are from the light reception elements belonging to those pixels that correspond to that focus detection region. The detection of these defocus amounts may be performed, as explained below, by a per se known split pupil phase difference detection method.

Figure 4:
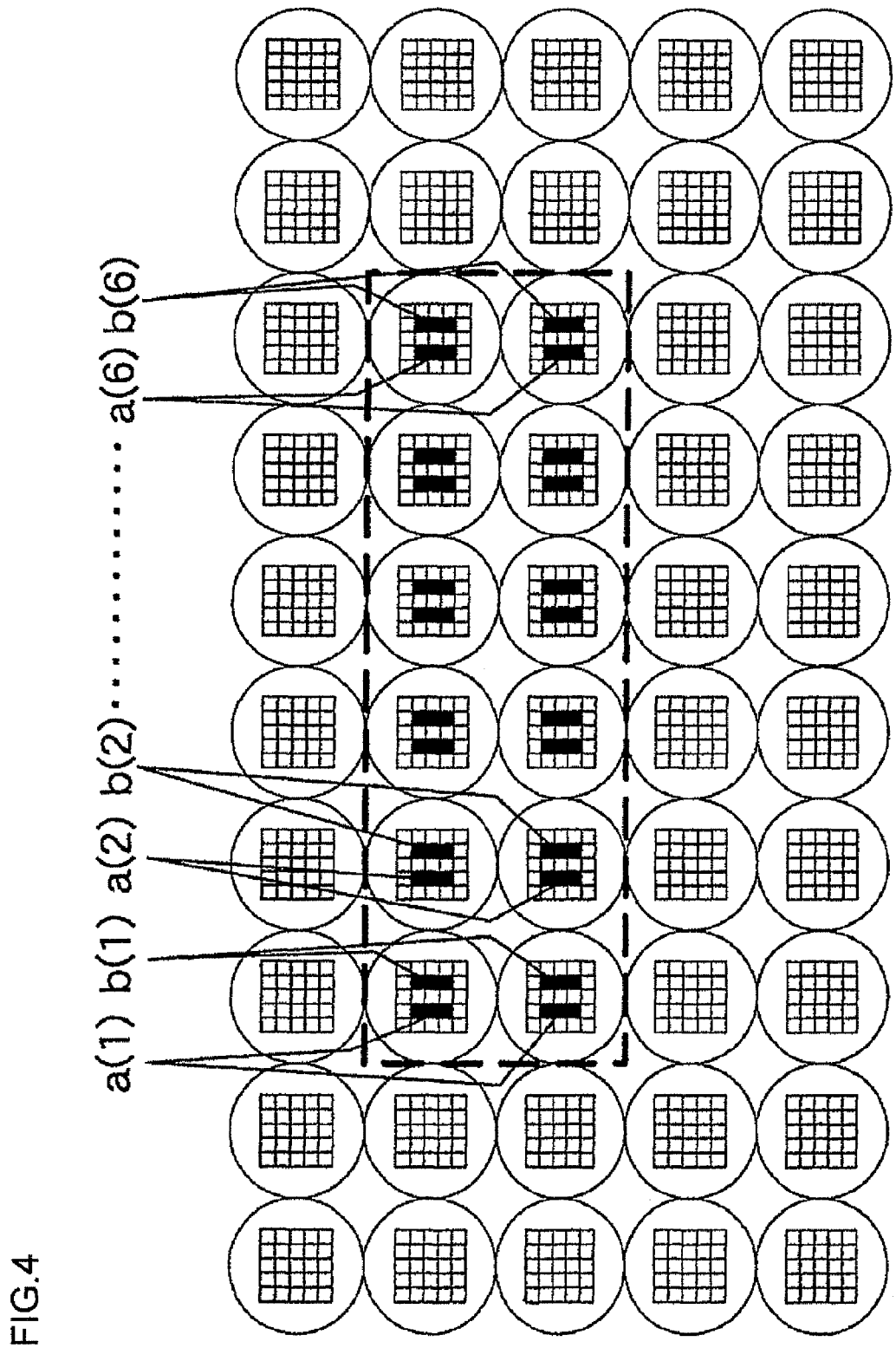
FIG. 4 is a figure for explanation of a method of detecting defocus amount.

The method by which the focus detection calculation unit 11 detects the defocus amount will now be explained with reference to FIGS. 4 and 5. FIG. 4 is a figure for explanation of the way the defocus amount is detected. In this figure, certain pixels that correspond to the focus detection region set by the focus detection region setting unit 10 are shown as magnified. The length in the longitudinal direction of the focus detection region, that is the direction for detection of image deviation, is determined in an appropriate manner. While FIG. 4 shows an example in which the two columns of pixels surrounded by the broken line are selected as the pixels that correspond to the focus detection region, it would also be acceptable, as shown in FIG. 5, to arrange to select single lines of pixels as the pixels that correspond to the focus detection region. Or, it would also be acceptable to arrange to select lines of pixels (rows, columns, or diagonal lines) three or more pixels wide, as the pixels that correspond to the focus detection region. On the basis of the received light signals from the plurality of light reception elements within the focus detection region that correspond to the micro lenses, the focus detection calculation unit 11 generates a focus detection signal, in other words a pair of signal sequences for focus detection, that specify the amount of image deviation between a pair of ray bundles that have passed through different pupil regions of the photographic optical system 1*a*.

Referring to FIGS. 4 and 5, the focus detection calculation unit 11 extracts the outputs of the light reception elements under the micro lenses that are shown in the figures as black as the first signal sequence $\{a(i)\}$ and the second signal sequence $\{b(i)\}$ (where i=1, 2, 3, ... ), that are the pair of signal sequences for focus detection, as shown by the following Equations (1):

The first signal sequence $\{a(1)\}=a(1),a(2),a(3),$

The second signal sequence $\{b(1)\}=b(1),b(2),b(3),$ (1)

It should be understood that in the example shown in FIG. 4, in order to obtain each of $\{a(i)\}$ and $\{b(i)\}$ and thus to generate the corresponding signal sequences, along with adding together the outputs of a certain set of three columnar adjacent light reception elements under each micro lens, these sums are then added together for each pair of upper and lower micro-lenses in the two focus detection pixel rows. Furthermore, if a focus detection region only one pixel wide is set, or a focus detection region that slopes at 45° is set, then the signal sequences are generated by determining the light reception elements for focus detection as shown in FIG. 5. Other variations upon this concept, such as arrangements of the light reception elements for focus detection in the case of a focus detection region that is three pixels or more wide, or in the case of a focus detection region that extends horizontally along a pixel row, will be apparent to one of ordinary skill in the relevant art based upon the disclosure herein.

The focus detection calculation unit 11 performs image deviation calculation using the first signal sequence $\{a(i)\}$ and the second signal sequence $\{b(i)\}$, and calculates the defocus amount as described below. First, using the following Equation (2), from the first signal sequence $\{a(i)\}$ and the second signal sequence $\{b(i)\}$, for various values of a trial shift amount n, the focus detection calculation unit 11 obtains a set of trial correlation amounts C(n) between the pair of images (signal sequences):

$$C(n)=\Sigma|a(i)-b(j)| \quad (2)$$

In the above Equation (2), j−i=n, (i.e. the corresponding trial shift amount), and the summation sign means calculation of the total sum of the absolute values of the shown differences from an appropriate lower limit pL to an appropriate upper limit qL.

The actual shift amount N is obtained from the set of trial correlation amounts

C(n) obtained using Equation (2) above. That is, the value of the trial shift amount n for which the corresponding trial correlation amount C(n) assumes its minimal value (termed Co) is termed N, and the trial correlation amount for the shift amount (N−1) is termed Cr while the trial correlation amount for the shift amount (N+1) is termed Cf. The final precise shift amount Na is obtained from the set of these three trial correlation amounts Cr, Co, and Cf by using the following Equations (3):

$$DL=0.5\times(Cr-Cf)$$

$$E=\max\{Cf-Co, Cr-Co\}$$

$$Na=N+DL/E \quad (3)$$

The amount of image deviation Δn at the focus detection surface is calculated by adding, to this value, a correction amount (a constant 'const') that corresponds to the position of the focus detection surface, thus:

$$\Delta n=Na+const \quad (4)$$

Next, using a constant Kf that depends upon the slant angle of detection, the focus detection calculation unit 11 calculates a defocus amount Df from the amount of image deviation Δn by using the following Equation (5):

$$Df=Kf\times\Delta n \quad (5)$$

The focus detection calculation unit 11 performs detection of the defocus amount by calculating the defocus amount Df in this manner. When the digital camera of this first embodiment performs photography, the defocus amounts detected for each of the focus detection regions and the positions of the corresponding focus detection regions are recorded upon the recording medium as a portion of the photographic subject information previously described.

On the basis of the defocus amount Df that has been calculated by the defocus calculation unit 10, the lens drive amount calculation unit 12 calculates a drive amount for the focus adjustment lens in the photographic optical system 1*a*.

Here, calculation of the lens drive amount is performed by calculating a lens target position, which is the target drive position for the focus adjustment lens. It should be understood that this lens target position is equivalent to a position for the focus adjustment lens at which the above defocus amount becomes zero.

The lens drive control unit 13 outputs a drive control signal to the lens drive motor 14 on the basis of this lens drive amount that has been calculated by the lens drive amount calculation unit 12, in other words on the basis of the lens target position for the focus adjustment lens. Focus adjustment of the photographic optical system 1a is performed by the lens drive motor 14 driving the focus adjustment lens according to this drive control signal, so as to shift it to the lens target position.

On the basis of the image capture information acquired by the imaging element 6 and recorded upon the recording medium, the image creation unit 17 (A) creates a pan focus image, and (B) synthesizes a captured image focused at an image surface at a desired position. And this captured image synthesized by the image creation unit 17 is replayed and displayed upon the display unit 19. The display unit 19 consists of a display device such as a liquid crystal display or the like, and, according to display control performed by the control device 18, is capable of displaying images and video of various types, including captured images synthesized as described above.

(A) Creation of a Pan Focus Image

The creation of a pan focus image by the image creation unit 17 will now be explained. The image creation unit 17 creates a captured image corresponding to minimum aperture in a pseudo manner by extracting, from among the received light signals that are specified by the image capture information recorded upon the recording medium, only the received light signals of those light reception elements that are positioned at the centers of the pixel regions shown in the example in FIG. 3 (for example, the signals from the light reception elements that are positioned at the centers of the light reception elements 61, directly under the centers of the micro lenses 71). This generated image is a pan focus image in which almost the entire photographic subject is focused upon the screen. It should be understood that, if the range that is the subject for this extraction of received light signals (i.e. the area of a circle centered upon the center of each pixel) is widened so that the number of received light signals that are extracted is increased, then the captured image that is generated corresponds to a case in which the aperture opening is larger.

(B) Synthesis of a Captured Image Focused at the Desired Image Surface

A method of synthesis of a captured image by the image creation unit 17 will now be explained with reference to FIG. 6. FIG. 6A is a figure for explanation of a method of synthesizing a captured image focused at an image surface pa, for which the distance from the surface of image formation by the photographic optical system 1a is h. In FIG. 6A, the rays 21 through 25 of an incident bundle from the photographic optical system 1a that corresponds to the position on the image surface pa shown by the reference symbol 20, after having passed through the micro lens array 7 (i.e. through the micro lenses 71), are respectively received by the light reception elements a1, b2, c3, d4, and e5 of the pixels 61a through 61e. Accordingly it is possible to create an image signal for the pixel 61c that corresponds to the position 20 upon the image surface pa by selecting, from among the received light signals specified by the image capture information recorded upon the recording medium, only the received light signals from the light reception elements a1, b2, c3, d4, and e5, and by combining those received light signals. For other positions upon the image surface pa as well, by creating an image signal for the corresponding pixel by combining the received light signals in a similar manner, it is possible to synthesize a captured image that is focused at the image surface pa.

FIG. 6B is a figure for explanation of a method of synthesizing a captured image focused at an image surface pb, for which the distance from the surface of image formation by the photographic optical system 1a is 0; in other words, for synthesizing a captured image at the surface of image formation by the photographic optical system 1a. In FIG. 6B, the rays 31 through 35 of an incident bundle from the photographic optical system 1a that corresponds to the position on the image surface pb shown by the reference symbol 30, after having passed through the micro lens array 7 (i.e. through the micro lenses 71), are respectively received by the light reception elements c1, c2, c3, c4, and c5 of the pixel 61c. Accordingly it is possible to create an image signal for the pixel 61c that corresponds to the position 30 upon the image surface pb by selecting, from among the received light signals specified by the image capture information recorded upon the recording medium, only the received light signals from the light reception elements c1, c2, c3, c4, and c5, and by combining those received light signals. For other positions upon the image surface pb as well, by creating an image signal for the corresponding pixel by combining the received light signals in a similar manner, it is possible to synthesize a captured image that is focused at the image surface pb.

As has been explained above, by appropriately selecting and combining the received light signals according to the distance from the surface at which image formation is performed by the photographic optical system 1a to the desired image surface, and thereby obtaining an image signal for each pixel, it is possible to synthesize a captured image focused at any desired image surface.

Moreover, by changing the number of light reception elements that are the subjects for selection of their received light signals, it is also possible to synthesize captured images of a plurality of types that appear at the same image surface, but for which the aperture openings are different. For example, in the examples shown in FIGS. 6A and 6B, if only the received light signal from the single light reception element at the center of each pixel region (in the case of the pixel region 61c, the light reception element c3) is selected, then it is possible to synthesize a captured image corresponding to the minimum aperture, as in the case of the pan focus image described above.

And, if the range that is the subject for this extraction of received light signals (i.e. the area of a circle centered upon the center of each pixel) is widened so that the number of selected and extracted light signals is increased, then the captured image that is synthesized corresponds to a case in which the aperture opening is larger.

It should be understood that the distance from the above described surface of image formation to the desired image surface corresponds to the defocus amount described above, detected by the focus detection calculation unit 11. In other words, the defocus amount detected by the focus detection calculation unit 11 means the distance between the surface of image formation by the photographic optical system 1a and the micro lens array 7, when the received light signal from the imaging element 6 was obtained by the sensor control unit 8.

While a method of captured image synthesis was explained with reference to FIGS. 6A and 613 above for the case in which the image surface that is the subject of image synthesis was in front of the surface of image formation (i.e. was closer than the surface of image formation to the photographic optical system 1*a*), it would also be possible to synthesize a captured image in a similar manner, if the image surface that is the subject of image synthesis is behind the surface of image formation (i.e. is further than the surface of image formation from the photographic optical system 1*a*).

The control device 18 consists of a microcomputer and memory and so on, and performs processing for implementation of the functions of the sensor control unit 8, the photographic subject recognition unit 9, the focus detection region setting unit 10, the focus detection calculation unit 11, the lens drive amount calculation unit 12, the lens drive control unit 13, the buffer memory 18M, and the image creation unit 17 described above, and also performs operational control for the digital camera. Moreover, the control device 18 also temporarily stores the information necessary for this processing and control.

Figure 8:
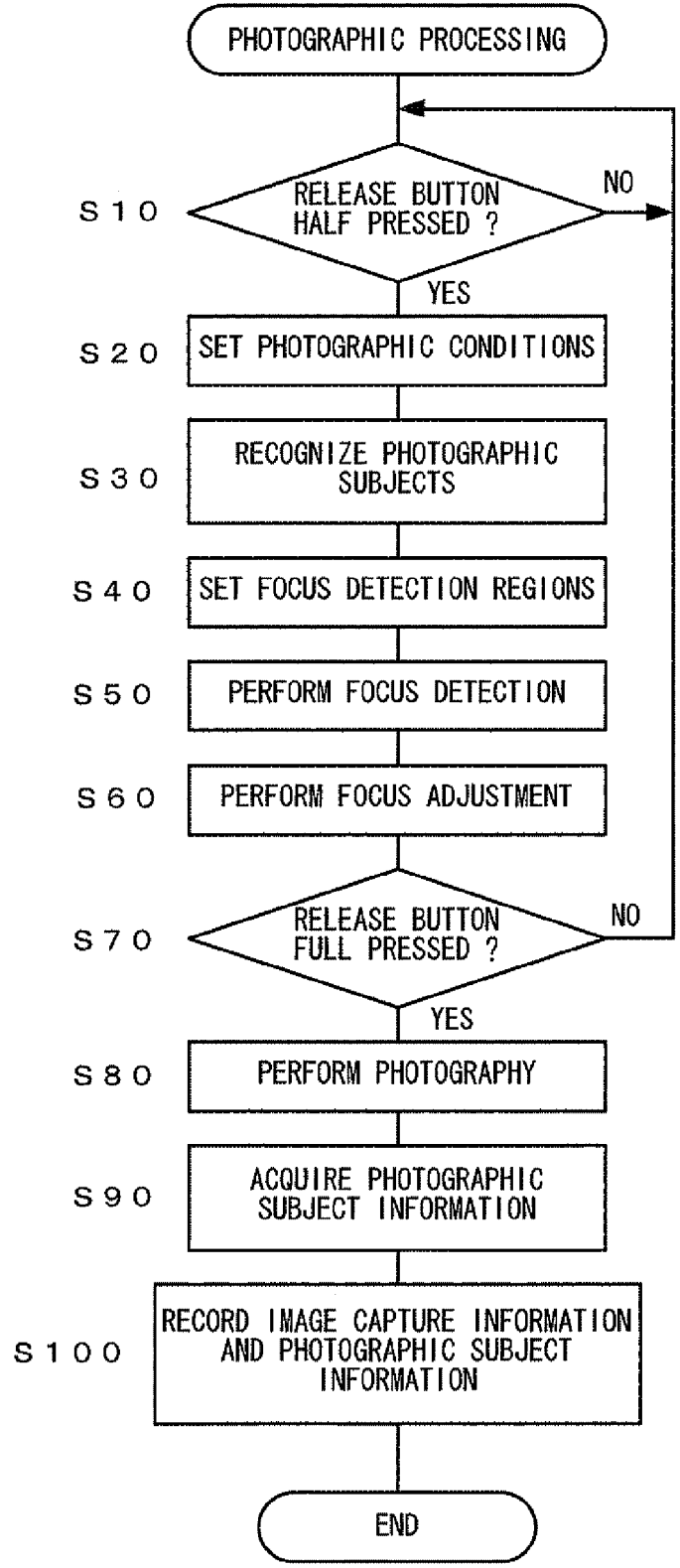
FIG. 8 is a flow chart for photographic processing according to the first embodiment.
Figure 9:
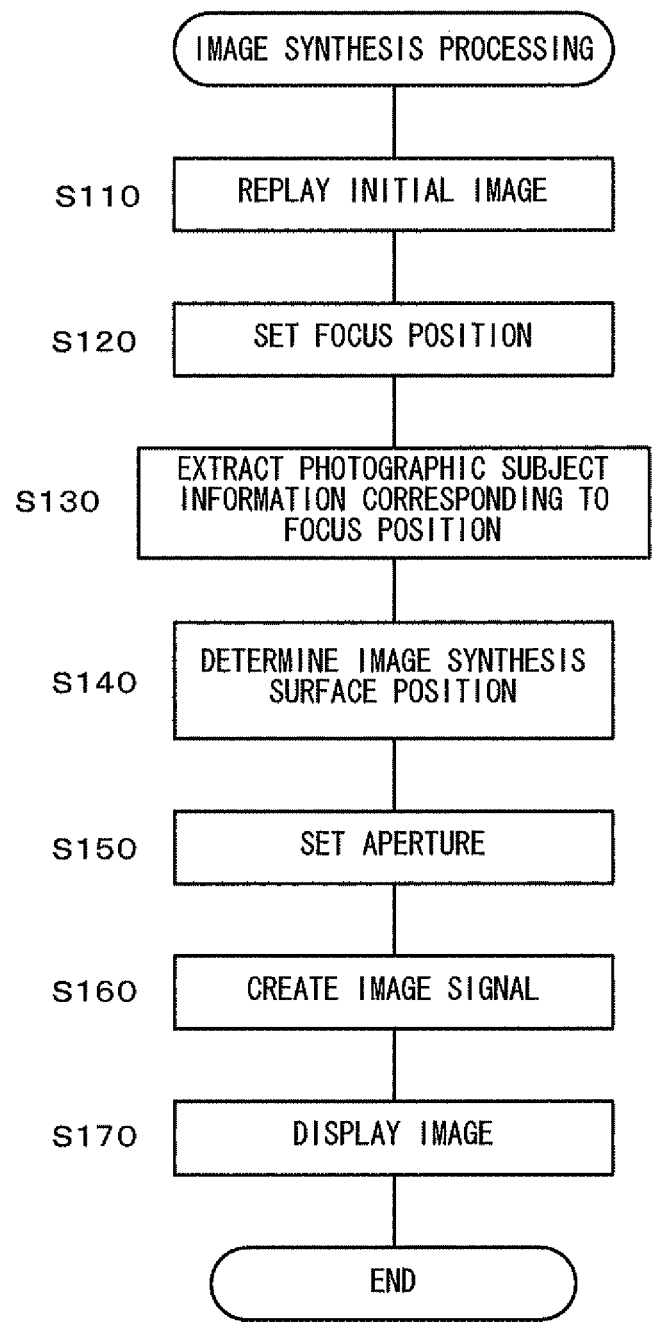
FIG. 9 is a flow chart for image synthesis processing according to the first embodiment.

Flow charts of processing executed by the control device 18 of the digital camera according to this first embodiment are shown in FIGS. 8 and 9. As image capture information, the digital camera of this first embodiment records upon the recording medium all of the information from the plurality of light reception elements specifying their received light signals, acquired for all of the pixels during photography, as previously described. And, according to operation performed by the user after photography, on the basis of the image capture information recorded upon the recording medium, this camera synthesizes a captured image focused at an image surface at any desired distance, and displays this captured image upon the display unit 19. FIG. 8 is a flow chart showing the photographic processing that is executed during photography, while FIG. 9 is a flow chart showing image synthesis processing that is executed when synthesizing and displaying a captured image focused at an image surface at any desired distance.

The photographic processing according to this first embodiment will now be explained with reference to the flow chart shown in FIG. 8. In a step S10, the control device 18 makes a decision as to whether or not a release button provided to the digital camera, not shown in the figures, has been half press operated by the user. If the release button is being half press operated, then the control device 18 transfers the flow of control to the next step S20.

In this step S20, the control device 18 sets the photographic conditions for the digital camera. Here, the setting of the photographic conditions is performed by setting the ISO sensitivity, the shutter speed, and the aperture value during photography on the basis of the brightness at the surface of image formation as detected on the basis of the photometric signal outputted from the photometric sensor 16, and on the basis of a photographic mode set in advance and the like.

Next, in a step S30, the control device 18 recognizes the photographic subject or subjects with the photographic subject recognition unit 9. Here, as described above, using a technique of template matching or the like, specified images within the image produced by the photographic optical system 1*a* as given by the received light signals from the imaging element 6 are recognized as being photographic subjects, and the number of these photographic subjects, their positions and their sizes, and which of them is considered to be the main photographic subject are specified.

In the next step S40, with the focus detection region setting unit 10, the control device 18 sets one or more focus detection regions within the image surface of the photographic optical system 1*a* on the basis of the results of photographic subject recognition in the step S30. Here, this setting of the focus detection regions is performed as explained below.

Figure 7C:
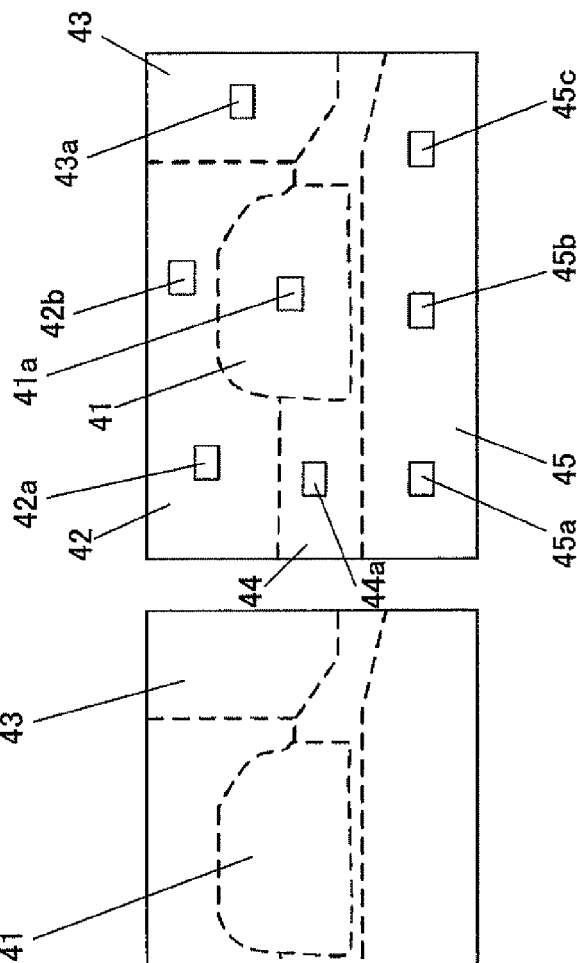
FIGS. 7A, 7B, and 7C are figures for explanation of a method of setting a focus detection region.
Figure 7B:
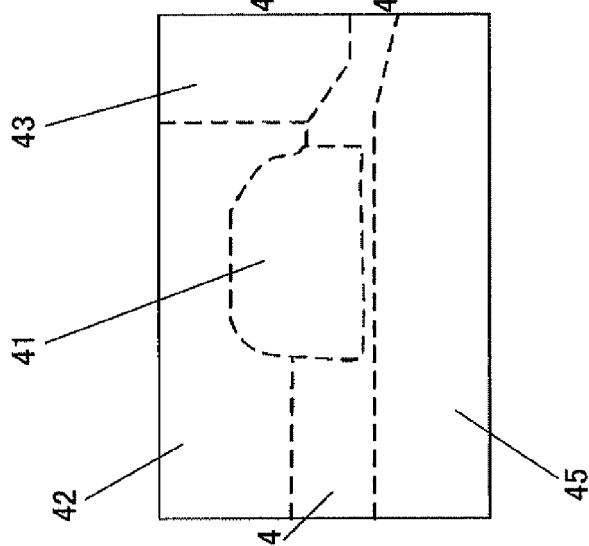
Figure 7A:
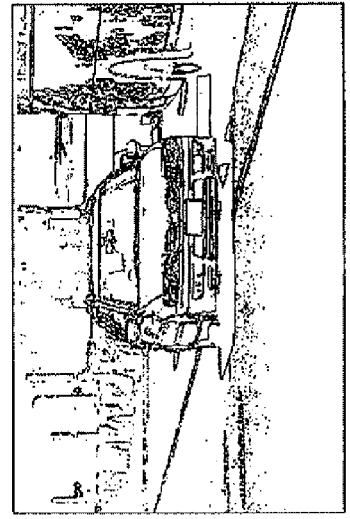

FIGS. 7A, 7B, and 7C are figures for explanation of the way in which the focus detection regions are set in the step S40. FIG. 7A shows an example of an image specified by the received light signals from the imaging element 6. Due to the photographic subject recognition performed for this image in the step S30 by the photographic subject recognition unit 9, the image surface has been subdivided into a plurality of photographic subject regions, as shown for example by the reference symbols 41 through 45 in FIG. 7B. The photographic subject region 41 is a region corresponding to a vehicle that is positioned in the vicinity of the center of the image surface, and that has been recognized as being the main photographic subject in the image of FIG. 7A. It should be understood that it is possible to determine which of the photographic subjects is considered as being the main photographic subject, on the basis of the positional relationships of the photographic subjects and their sizes and so on. Moreover, a photographic subject region 42 corresponds to the background; a photographic subject region 43 corresponds to another vehicle that is traveling on the right side of the vehicle that is the main photographic subject; a photographic subject region 44 corresponds to the road surface beside and around the main photographic subject vehicle; and a photographic subject region 45 corresponds to the road surface in front of the main photographic subject vehicle.

In the step S40, as shown in FIG. 7C, the focus detection region setting unit 10 sets focus detection regions for each of the photographic subject regions 41 through 45, of numbers corresponding to their sizes. In other words, the focus detection region setting unit 10 sets just one focus detection region for each of the photographic subject regions 41, 43, and 44 that are comparatively small; i.e. it sets the focus detection regions 41*a*, 43*a*, and 44*a*. Moreover, two focus detection regions 42*a* and 42*b* are set for the photographic subject region 42 that is larger than the three regions above, while three focus detection regions 45*a*, 45*b*, and 45*c* are set for the photographic subject region 45 that is the largest. It should be understood that it is desirable for the positions at which these focus detection regions are set to be positions that are balanced as well as possible within the above photographic subject regions. For example, each of the focus detection regions 41*a*, 43*a*, and 44*a* is set to the position of the barycenter of its respective photographic subject region 41, 43, and 44. Moreover, the focus detection regions 42*a* and 42*b* are set to the positions of the barycenters of two regions obtained by bisecting the photographic subject region 42, while the focus detection regions 45*a*, 45*b*, and 45*c* are set to the positions of the barycenters of three regions obtained by trisecting the photographic subject region 45.

As has been explained above, the focus detection region setting unit 10 changes the number of focus detection regions that it sets in each of the photographic subject regions defined by the photographic subject recognition unit 9 within the image produced by the photographic optical system 1*a*, according to the sizes of these photographic subject regions. It should be understood that whether or not the set number of focus detection regions is to be changed, may be determined according to the proportion that the size of the photographic subject region occupies upon the image surface. For example, if the size of the photographic subject region is less than 15% of the image surface, then the number of focus detection regions that are set may be 1. And if the size of the photographic subject region is between 15% and 30% of the image surface, then the number of focus detection regions that are set may be 2, while if the size of the photographic subject region is greater than 30% of the image surface, then the number of focus detection regions that are set may be 3. The above suggested relationship between the sizes of the photographic subject regions and the number of focus detection regions that are set within them is only given by way of example, and is not to be considered as being limitative of the present invention.

Or, it would also be acceptable to arrange to determine the set positions and the numbers of the focus detection regions corresponding to each of the photographic subject regions, on the basis of the contrast of the image. For example, in each of the photographic subject regions, a focus detection region may be set at each position where the image has a contrast greater than a predetermined value. At this time, it would be acceptable to arrange to set focus detection regions for all of the positions at which the contrast is greater than the predetermined value, irrespective of the size of the photographic subject region; or, alternatively, it would be acceptable to determine an upper limit for the number of focus detection regions that can be set, according to the size of the photographic subject region. By doing this, it is possible to detect the defocus amount for each focus detection region that has been set in a highly reliable manner.

While, in the above, an example has been given of a case in which at least one focus detection region was set for each of the photographic subject regions 41 through 45 defined by the photographic subject recognition unit 9 within the image produced by the photographic optical system 1*a*, it would also be acceptable to arrange not to set any focus detection region at all for some photographic subject region that does not satisfy some predetermined condition. For example, it would be possible to eliminate, from the subjects for setting focus detection regions, a photographic subject region for which the image contrast is less than the above described predetermined value, or a photographic subject region whose size is less than a predetermined value, or the like. Since, by doing this, no focus detection region is set for a photographic subject region for which there is a fear that it will not be possible to detect a correct defocus amount, accordingly it is possible to prevent decrease of the accuracy of defocus amount detection.

In the next step S50 the control device 18 detects, with the focus detection calculation unit 11, the defocus amount for each of the focus detection regions set in the step S40. This detection of the defocus amounts is performed, as described above, on the basis of the received light signals from those light reception elements, among the received light signals from the imaging element 6, that belong to the pixels corresponding to the focus detection regions that have been set. It should be understood that the defocus amounts detected here are values that specify the focal adjustment state of the photographic optical system 1*a* upon the photographic subjects that correspond to those focus detection regions. In other words, they specify the amounts of deviation, with respect to the surface of optical formation by the photographic optical system 1*a*, of the image surfaces at which the photographic subjects corresponding to those focus detection regions are focused.

In the next step S60, on the basis of the defocus amounts detected in the step S50, the control device 18 performs focus adjustment of the photographic optical system 1*a* with the lens drive amount calculation unit 12. Here, the lens drive amount is calculated on the basis of that defocus amount, among the defocus amounts that have been detected, for the focus detection region that corresponds to the main photographic subject, so as to focus upon that main photographic subject. And a drive control signal is outputted from the lens drive amount calculation unit 12 to the lens drive motor 14, so that focus adjustment of the photographic optical system 1*a* is performed by the lens drive motor 14 driving the focus adjustment lens.

In the next step S70, the control device 18 makes a decision as to whether or not the release button provided to the digital camera, not shown in the figures, has been full press operated by the user. If the release button is not being full press operated, then the flow of control returns to the step S10 and the processing described above is repeated. On the other hand, if the release button is being full press operated, then the control device 18 transfers the flow of control to the next step S80.

In this step S80, the control device 18 performs photography by capturing the photographic subject image imaged by the ray bundle incident via the photographic optical system 1*a* with the imaging element 6, thus acquiring image capture information that includes information from the plurality of light reception elements for each single pixel.

Then in the next step S90 the control device 18 acquires the photographic subject information. Here, photographic subject information as previously described is acquired on the basis of the results of execution of the steps S30 through S50 directly before the full press operation of the release button detected in the step S70. This photographic subject information includes information specifying the results during photography of recognition of the photographic subjects, the focus detection regions, and the defocus amounts.

Finally in the step S100, the control device 18 records the image capture information acquired in the step S80 and the photographic subject information acquired in the step S90 upon the recording medium, in mutual correlation. When this step S100 has been executed, the control device 18 terminates execution of the flow chart of FIG. 8. The photographic processing is performed as explained above.

The image synthesis processing according to this first embodiment will now be explained with reference to the flow chart shown in FIG. 9. This image synthesis processing is performed when, via an operation button not shown in the figures provided to the digital camera, the user issues a command to the digital camera for image synthesis. In a first step S110, the control device 18 reads out image capture information that was recorded upon the recording medium by the step S100 of the FIG. 8 flow chart, and replays an initial image based upon this image capture information upon the display unit 19. Here, among the captured image information that has been read out, the information for the received light signals from the light reception elements at the center of each of the pixels of the imaging element 6 is selected, and the image specified by this received light signal information is displayed as the initial image. As previously described, this initial image is a pan focus image that is focused upon all of the photographic subjects. Or it would also be acceptable to select received light signals as shown in FIG. 6B, and to display an image specified by this received light signal information as the initial image. In this case, the initial image is a captured image corresponding to a surface of image formation by the photographic optical system 1*a* for which the focus was adjusted upon the main photographic subject in the step S60 of the FIG. 8 flow chart, in other words is a captured image for which the amount of deviation of the image surface is 0.

In the next step S120, the control device 18 sets a focus position for when performing captured image synthesis in the initial image that was displayed in the step S110. Here, for example, this position may be set as the focus position when the user designates some desired position in the initial image by actuating an operation button provided to the digital camera but not shown in the figures. Or, it would also be acceptable to arrange for the digital camera to select some position in the initial image automatically, and to set that position as the focus position.

In the step S130 the control device 18 extracts, from among the photographic subject information that is recorded upon the recording medium in correlation with the image capture information read out in the step S110, the photographic subject information corresponding to the focus position set in the step S120. In other words, for the focus position that has been set, the control device 18 extracts the information such as the position, the number, the size and so on of the corresponding photographic subject region. Furthermore, it also extracts information for the focus detection regions that were set for this photographic subject region, and the defocus amounts that were detected for these focus detection regions.

In the step S140, the control device 18 determines the position of the image synthesis surface, on the basis of the defocus amount specified in the photographic subject information extracted in the step S130. It should be understood that, if a plurality of items of defocus amount information have been extracted as the photographic subject information, then it will be acceptable to arrange to determine the position of the image surface for which a captured image is to be synthesized, by calculating the average of these values or their minimum or maximum value or the like as a representative defocus amount.

In the step S150, the control device 18 sets an aperture for when synthesizing the captured image. This aperture setting may, for example, be performed by the user actuating an operation button provided to the digital camera but not shown in the figures. Or it would also be acceptable to arrange for the digital camera to set the aperture automatically.

In the step S160, with the image creation unit 17, the control device 18 creates an image signal for displaying a captured image corresponding to the image surface position determined in the step S140. Here, on the basis of the defocus amount specified in the photographic subject information extracted in the step S130 and corresponding to the amount of deviation of the image surface at the determined image surface position, a portion from among the received light signals from the light reception elements of the pixels specified by the image capture information are selected by a method like the one explained above with reference to FIG. 6. At this time, the number of light reception elements that are to be the subjects for selection of their received light signals is determined corresponding to the aperture set in the step S150. By creating an image signal in this manner on the basis of the selected received light signals, it is possible to synthesize a captured image that is focused upon the photographic subject that was set at the focus position.

In the step S170, the control device 18 displays upon the display unit 19 a captured image based upon the image signal generated in the step S160. When this step S170 has been executed, the control device 18 terminates execution of the flow chart of FIG. 9. The image synthesis processing is performed as explained above.

According to the first embodiment as explained above, the following beneficial operational effects may be obtained.

(1) In the photographic processing of FIG. 8, the control device 18 detects (in the step S50) the defocus amount, that specify the amount of deviation of the image surface of the photographic optical system 1a when the received light signals were received from the imaging element 6. Furthermore, in the image synthesis processing of FIG. 9, the control device 18: extracts (in the step S130) the photographic subject information corresponding to the focused position; selects a portion of the received light signals from the light reception elements of the imaging element 6 that are recorded upon the recording medium as the captured image information, as shown in FIG. 6, on the basis of the defocus amount in the extracted photographic subject information; and then creates (in the step S160) an image signal on the basis of that portion of the received light signals that has been selected. Since it is arranged to perform synthesis of a captured image by creating an image signal in this manner, accordingly, when synthesizing after photography, from the photographic data, an image at an image surface that is focused at a photographic subject that is at any desired distance, it is possible to set the image surface that is to be the subject of image synthesis rapidly.

(2) The control device 18 specifies the positions within the image surface that are to be the subjects of defocus amount detection in the step S50 by setting the focus detection regions in the image surface of the photographic optical system 1a (in the step S40). And, in the step S160, a portion of the received light signals is selected on the basis of a defocus amount for a position within the image surface specified in this manner as the focus detection region. Since this is done, it is possible to detect the defocus amount, and it is possible to perform synthesis of a captured image, for an appropriate position within the image surface.

(3) The control device 18 recognizes a specified image within the image produced by the photographic optical system 1a as being the photographic subject (in the step S30). In this manner, the defocus amounts of the focus detection regions set in the step S40 for the positions of the photographic subjects that have been recognized, are detected in the step S50. Accordingly, it is possible automatically to detect the defocus amount for to a photographic subject in the image surface.

(4) In the step S30, on the basis of the photographic subjects that have been recognized, the control device 18 subdivides the image surface of the photographic optical system 1a into a plurality of photographic subject regions. And, in the step S50, defocus amounts are detected for the focus detection regions that have been set in the step S40 for these subdivided photographic subject regions. Since this is done, if a plurality of photographic subjects are present within the image surface, it is possible reliably to detect a defocus amount for each of these photographic subjects.

(5) If the size of one of the photographic subject regions that were subdivided in the step S30 is greater than a predetermined proportion of the image surface, then, in the step S50, the control device 18 detects a plurality of defocus amounts corresponding respectively to a plurality of focus detection regions that have been set in the step S40 for this photographic subject region. Accordingly, for that photographic subject region, it is possible to detect an appropriate number of defocus amounts, according to the proportion within the image surface that it occupies.

(6) Furthermore it would also be acceptable to arrange for the control device 18, on the basis of the received light signals from the imaging element 6, to set focus detection regions in the step S40 at positions in the image of the photographic optical system 1a having contrast greater than a predetermined value, and to detect the defocus amounts for these focus detection regions in the step S50. If this is done, it is possible to detect the defocus amounts with high reliability.

(7) In the step S60, the control device 18 performs focus adjustment of the photographic optical system 1a on the basis of the defocus amounts detected in the step S50. And the ray bundle from the photographic optical system 1a for which focus adjustment has been performed in this manner is received by the imaging element 6, that outputs received light signals that are recorded upon the recording medium as image capture information; and an image signal is created in the step S160 on the basis of these received light signals that have been recorded. Since this is done, it is possible to perform focus adjustment of the photographic optical system 1*a* during photography in an appropriate manner.

It should be understood that, while in the first embodiment described above the photographic subject was recognized in the step S30 on the basis of the received light signals outputted from the imaging element 6, it would also be acceptable to arrange to recognize the photographic subject on the basis of the photometric signal outputted from the photometric sensor 16. Or, alternatively, it would also be acceptable to provide a dedicated imaging element for photographic subject recognition to the camera, separately from the imaging element 6 and the photometric sensor 16, and to arrange to recognize the photographic subject on the basis of image information captured using this dedicated imaging element.

Embodiment Two

Next, a second embodiment of the present invention will be explained. In the first embodiment described above, an example was explained in which information about the received light signals from all of the plurality of light reception elements possessed by each pixel was recorded upon the recording medium during photography as image capture information, and synthesis of a captured image after photography was performed based thereupon. By contrast, in this second embodiment, an example will be explained in which a pan focus image is created during photography, a captured image whose image surface is matched to the main photographic subject specified in this pan focus image is synthesized, and information for this image is recorded upon the recording medium.

The flow of processing executed by the control device 18 of the digital camera of this second embodiment will now be explained with reference to the flow chart of FIG. 10. The control device 18 starts the processing of this flow chart when, for example, a release button provided to the digital camera and not shown in the figures is half press operated by the photographer.

Figure 10:
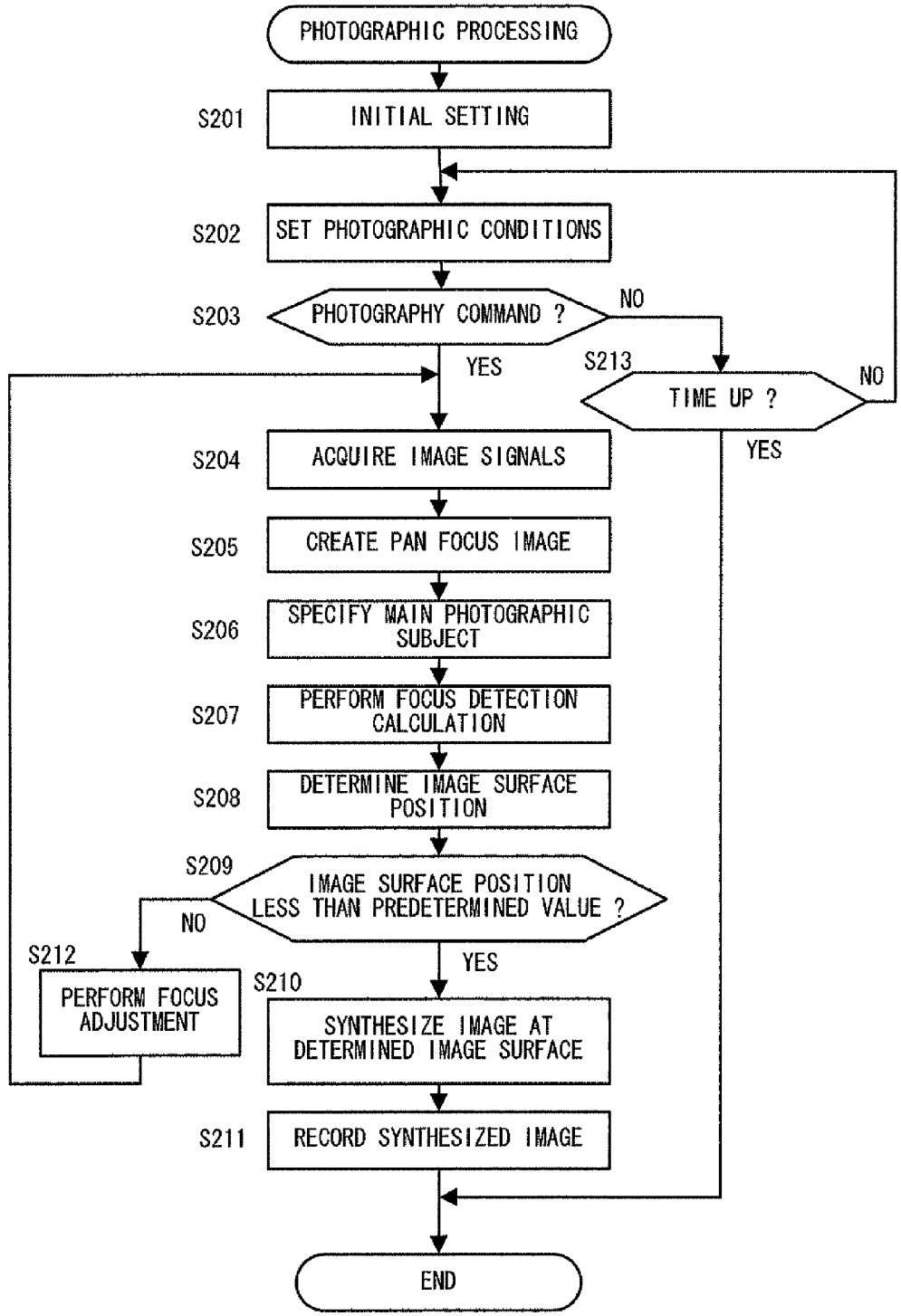
FIG. 10 is a flow chart for explanation of the flow of processing executed by a control device in a second embodiment.

In the step S201 of FIG. 10, the control device 18 performs initial setting, and then the flow of control proceeds to a step S202. This initial setting includes issuing a command to an aperture drive mechanism not shown in the figures to open the aperture 1*b*, and issuing a command to the lens drive control unit 13 to drive the focus adjustment lens to a predetermined position (for example to a position in which a photographic subject at a distance of 1 m is focused).

In the step S202 the control device 18 sets the photographic conditions, and then the flow of control proceeds to a step S203. In concrete terms, an ISO sensitivity, a control shutter timing, and a control aperture value are determined on the basis of the brightness of the surface of image formation as detected based upon the photometric signal outputted from the photometric sensor 16, and a photographic mode that is set in advance (for example, program auto, shutting timing priority auto, or the like).

In the step S203, the control device 18 makes a decision as to whether or not a photographic command has been issued. If a release button (not shown in the figures) has been full press operated by the photographer, then the control device 18 reaches an affirmative decision in this step S203, and the flow of control proceeds to a step S204. On the other hand, if the release button is not being full press operated, then the control device 18 reaches a negative decision in this step S203, and the flow of control is transferred to a step S213.

In this step S213, the control device 18 makes a decision as to whether or not time up has occurred. If the period timed in the state in which no further actuation has taken place after half press has started has reached a predetermined time period (for example 10 seconds), then the control device 18 reaches an affirmative decision in this step S213, and the processing of this FIG. 10 flow chart terminates. On the other hand, if the timed period has not yet reached the predetermined time period, then the control device 18 reaches a negative decision in this step S213, and the flow of control is returned back to the step S202 and the processing described above is repeated.

In the step S204, the control device 18 causes the imaging element 6 to acquire its image signals, and then the flow of control proceeds to a step S205. Due to this, the received light signals read out from the imaging element 6 by the sensor control unit 8 are converted into digital signals, and are temporarily stored in the buffer memory 18M.

In the step S205, the control device 18 causes the image creation unit 17 to create a pan focus image, and then the flow of control proceeds to a step S206. At this time, among the received light signals that have been temporarily stored in the buffer memory 18M in the step S204 (i.e., the received light signals from all of the light reception elements of all of the pixels of the imaging element 6), only the received light signals that are required for creation of the pan focus image are read out. In other words, as explained in the previous description of the first embodiment with reference to FIG. 3, a pan focus image is created on the basis of the received light signals from those light reception elements that are positioned at the centers of the pixel regions (hereinafter these will be termed the "first received light signals"). A signal that specifies the pan focus image created in this manner is temporarily stored in the buffer memory 18M. And then in the step S206 the control device 18 specifies the photographic subjects with the photographic subject recognition unit 9, and then the flow of control proceeds to a step S207. Here, the photographic subject recognition unit 9 recognizes one or more images of specified photographic subjects in the pan focus image stored in the buffer memory 18M using a technique of template matching or the like, as previously described, and specifies the positions, numbers, sizes and the like of these photographic subjects, and that is the main photographic subject.

On the basis of the positional relationships of these photographic subjects and their sizes and so on, the photographic subject recognition unit 9 is able also to specify the main photographic subject in the step S206 in a similar manner to the way the main photographic subject was recognized in the step S30 of FIG. 8 in the first embodiment described above. For example, the one among the specified photographic subjects that is largest (i.e. that photographic subject for which the number of pixels that make up its image is greatest), or the one among the specified photographic subjects that is closest to the center of the screen, may be specified as being the main photographic subject. At this time, according to the type of the photographic mode that is set in advance, when determining the main photographic subject, it would also be acceptable to arrange to determine a priority order for the positions and the sizes of the images for the photographic subjects. The focus detection region setting unit 10 determines focus detection regions for the main photographic subject region that has been specified by the photographic subject recognition unit 9. In concrete terms, it sets a focus detection region as shown in the example in FIG. 4 (the set of pixels surrounded by a broken line), so as to make that region correspond to the main photographic subject. At this time, it would also be acceptable to arrange to set the number of focus detection regions according to the size of the main photographic subject region, as explained with reference to the step S40 of the FIG. 8 flow chart in the above description of the first embodiment.

In the step S207, the control device 18 causes the focus detection calculation unit 11 to perform focus detection calculation, and then the flow of control proceeds to a step S208. Due to this, the focus detection calculation unit 11 detects the defocus amounts for the focus detection regions described above. As previously described, this detection of the defocus amounts is performed on the basis of those received light signals, among the received light signals stored in the buffer memory 18M, that are from the light reception elements belonging to the pixels that correspond to the set focus detection regions.

In the step S208, on the basis of the defocus amounts detected as described above, the control device 18 determines the position of the image surface for synthesis of a captured image (i.e. its distance from the micro lens array 7), and then the flow of control proceeds to a step S209. In this step S209, the control device 18 makes a decision as to whether or not this position of the image surface that has been determined (i.e. its distance from the micro lens array 7) is less than a predetermined value. If this distance is greater than the predetermined value (in other words, if it is not possible to synthesize a focused image), then the control device 18 reaches a negative decision in this step S209, and the flow of control is transferred to a step S212. On the other hand, if the distance of the image surface is less than the predetermined value (in other words, if it is possible to synthesize a focused image), then the control device 18 reaches an affirmative decision in this step S209, and the flow of control proceeds to a step S210.

In the step S210, the control device 18 issues a command to the image creation unit 17 for synthesis of a captured image that is focused at the image surface determined in the step S208, and then the flow of control proceeds to a step S211. On the basis of the defocus amount, the image creation unit 17 selects a portion of the received light signals (hereinafter termed the second received light signals) from among the received light signals stored in the buffer memory 18M, using the method for the first embodiment explained above with reference to FIGS. 6A and 6B. At this time, the range of light reception elements that are the subjects for selection of these second received light signals (the area of a circle centered upon the center of each pixel) is determined according to the control aperture value obtained in the step S202. By synthesizing an image signal on the basis of the second received light signals selected in this manner, it is possible to synthesize a captured image that is focused upon the main photographic subject.

And in the step S211 the control device 18 records the captured image information after synthesis upon the recording medium as an image file, and then the processing of this FIG. 10 terminates. Moreover, in the step S212 to which the flow of control proceeds if a negative decision is reached in the step S209 described above, the control device 18 performs focus adjustment of the photographic optical system 1a with the lens drive amount calculation unit 12, on the basis of the defocus amounts that were detected in the step S207. Due to this, the lens drive amount calculation unit 12 calculates a lens drive amount and a drive direction for focusing upon the main photographic subject, on the basis of the detected defocus amounts. And, when a drive control signal is outputted to the lens drive motor 14 from the lens drive amount calculation unit 12, the lens drive motor 14 shifts the focus adjustment lens forward or backward according to the calculated lens drive amount. By the above, focus adjustment of the photographic optical system 1a is performed. After this focus adjustment, the control device 18 returns the flow of control to the step S204, and the processing described above is repeated.

According to the second embodiment as explained above, the following beneficial operational effects may be obtained.

(1) This digital camera can obtain an image focused upon any desired photographic subject in a simple and easy manner, on the basis of image data that has been captured just once, since it is arranged for this camera to include: the micro-lens array 7 in which the plurality of micro lenses 71 are arrayed; the imaging element 6 having the plurality of light reception elements 61 corresponding to the plurality of micro lenses 71, that receives a ray bundle from the photographic optical system 1a via the micro lens array 7 and outputs a plurality of received light signals; the image creation unit 17 that creates a pan focus image on the basis of the first received light signals that are a portion of the plurality of received light signals outputted corresponding to the plurality of micro lenses 71; the photographic subject recognition unit 9 that selects an image of a specified subject from this pan focus image; the focus detection calculation unit 11 that detects an amount of deviation (i.e. a defocus amount) of the image surface of the photographic optical system 1a when the received light signals were obtained, for the position of the image of the specified subject in the pan focus image; and the image creation unit 17 that synthesizes a captured image on the basis of the second received light signals, that have been selected from among the plurality of received light signals outputted corresponding to each of the plurality of micro lenses 71, on the basis of the detected amount of deviation.

Furthermore, since the occasions on which it is required to shift the focus adjustment lens forward and backward with the lens drive motor 14 are limited on the basis of the magnitude of the detected defocus amount, accordingly it is not necessary to shift the focus adjustment lens forwards and backwards if a focused image can be obtained by image synthesis processing. Due to this, the usage of electrical power by the digital camera is reduced.

(2) Since the focus detection calculation unit 11 detects the amount of deviation on the basis of the plurality of received light signals outputted from the imaging element 6, accordingly it is not necessary to provide any light reception sensor for detecting the amount of deviation, other than the imaging element 6.

(3) Since the digital camera also includes the lens drive motor 14 and the lens drive control unit 13 for performing focus adjustment of the photographic optical system 1a, and since the plurality of received light signals are read out from the imaging element 6 on the basis of the ray bundle from the photographic optical system 1a after focus adjustment, accordingly it is possible to obtain a pan focus image is obtained that is focused upon almost all photographic subjects.

(4) Since it is arranged for this digital camera to perform focus adjustment of the photographic optical system 1a with the lens drive motor 14 and the lens drive control unit 13 when the amount of deviation exceeds a predetermined value, accordingly it is possible to perform focus adjustment when the amount of deviation is so large that it is not possible to synthesize a properly focused image.

(5) Since the image creation unit 17 is given the capability to select a selection range when selecting the second received light signals on the basis of the amount of deviation, accordingly it is possible to obtain synthesized images for which the aperture values are different.

(6) Since, in this digital camera, the plurality of received light signals are read out by the sensor control unit 8 from the imaging element 6 based upon a ray bundle from the photographic optical system lain the state in which the photographic optical system 1a is set to wide open aperture, accordingly it is possible to widen the possible aperture value range for the synthesized image, as compared with a case in which the received light signals are read out in the minimum aperture setting state.

(7) The pan focus image is obtained in a simple manner, since it is created on the basis of the received light signals from the light reception elements that correspond to the approximate center of the light reception elements 61 each corresponding to the plurality of micro lenses 71.

(8) Since the focus detection region setting unit 10 determines the position for detection of the amount of deviation on the basis of at least one of the position and the size of the image included in the pan focus image, accordingly it is possible for the photographer to obtain an image, focused upon any photographic subject that is considered that he wants to photograph, in a simple and easy manner.

(9) Since the focus detection region setting unit 10 determines a priority order for the positions and the sizes of the images according to the type of photographic mode, accordingly it is possible to determine a suitable position for the scene.

Variant Embodiment #1

Figure 11:
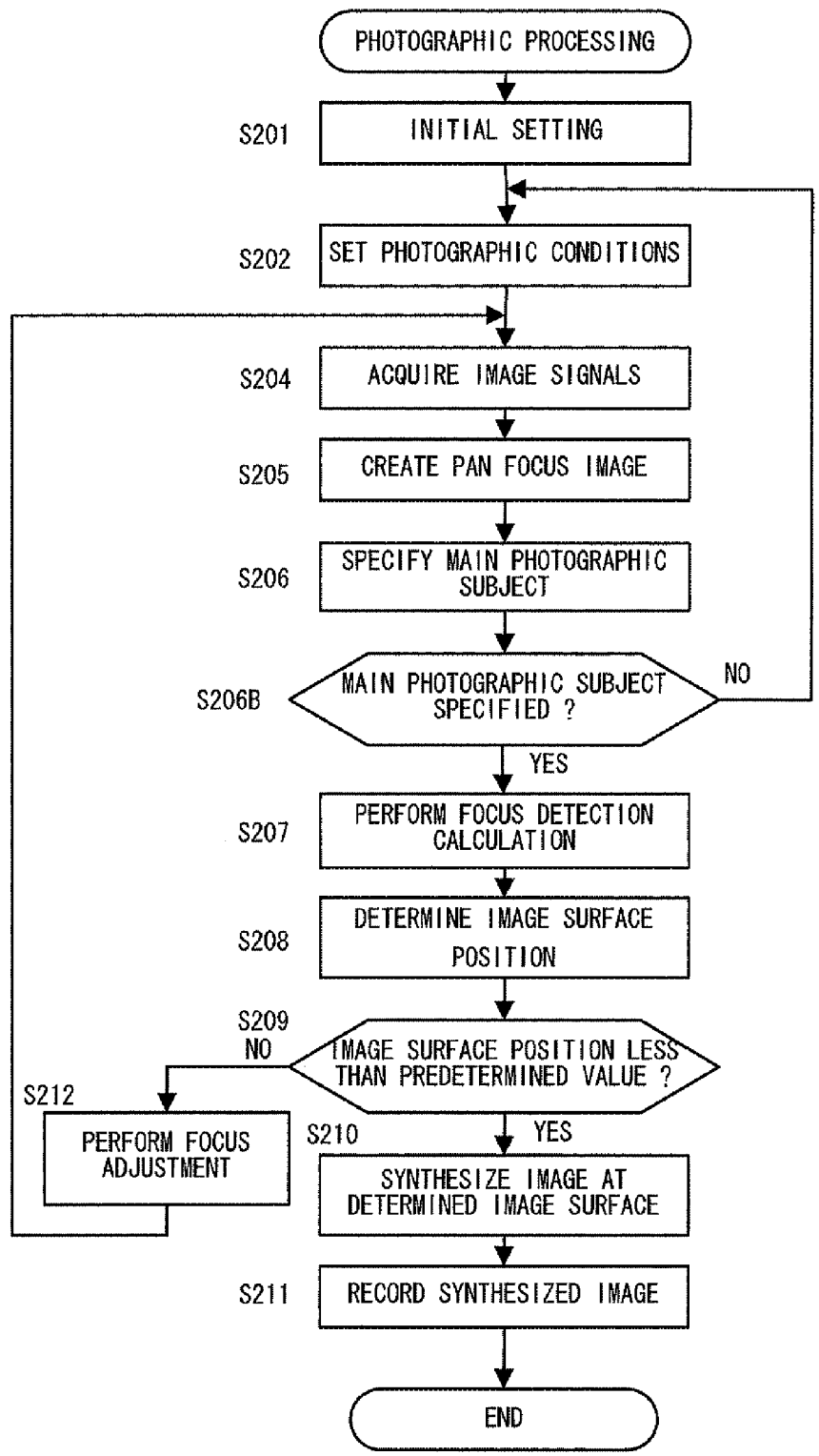
FIG. 11 is a flow chart for a first variant embodiment.

In the embodiments explained above, examples were described in which photography was performed and image capture information (an image signal) was acquired (in the step S80 of FIG. 8, and the step S14 of FIG. 10) when a photographic command was issued by the photographer (i.e. upon an affirmative decision in the step S70 of FIG. 8, and in the step S13 of FIG. 10). Instead of this, it would also be acceptable, in a first variant embodiment, to arrange for the control device 18 to issue a command for photography automatically. FIG. 11 is a flow chart for explanation of the flow of processing executed by the control device 18 in the second embodiment, in this case. The control device 18 may, for example, start the processing shown in FIG. 11 when an auto shutter release function of the digital camera is set to ON.

In FIG. 11, for those steps that perform similar processing to that shown in FIG. 10, the same step numbers are appended, and explanation thereof is omitted. After the step S206, in a step S206B, the control device 18 makes a decision as to whether or not a main photographic subject has been specified. And, if a main photographic subject has been specified, then the control device 18 reaches an affirmative decision in this step S206B, and the flow of control proceeds to a step S207. On the other hand, if no main photographic subject has been specified, then the control device 18 reaches a negative decision in this step S206B, and the flow of control returns to the step S202.

Since, according to this first variant embodiment, an image of a photographic subject is automatically recorded if that main photographic subject has been specified, accordingly it becomes possible for an image focused upon that photographic subject to be obtained automatically, merely by the photographer pointing the digital camera at that photographic subject.

It should be understood that although, in the above description, a case has been explained in which the concept of this first variant embodiment was applied to the second embodiment described above, it would also be possible to apply the concept of the first variant embodiment to the first embodiment, in a similar manner.

Variant Embodiment #2

By arranging for the image signals from the imaging element 6 to be read out at predetermined intervals (for example on a cycle of 30 frames per second), and by performing the processing described above upon each of these read out image signals in sequence, it would also be acceptable to arrange to capture a plurality of images in succession, and to record images synthesized therefrom to upon the recording medium as a video sequence.

Variant Embodiment #3

Figure 12:
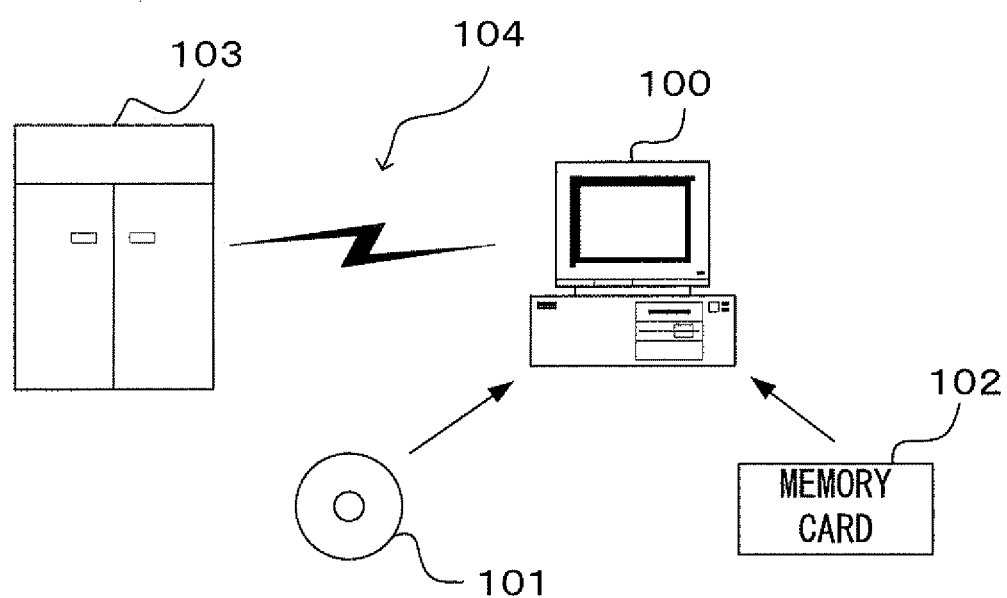
FIG. 12 is a figure showing an example in which a personal computer is used as an image synthesis device.

It would also be acceptable to arrange for the image synthesis processing in the first embodiment shown in the flow chart of FIG. 9, or the image synthesis processing in the second embodiment shown in the steps S15 through S21 of the flow chart of FIG. 10, to be performed by some type of image synthesis device other than a digital camera of the type explained in the above description of those embodiments. In this case, a program for executing such image synthesis processing may be supplied to the image synthesis device via a recording medium such as a CD-ROM or the like, or via an electrical communication line such as the internet or the like. FIG. 12 is a figure showing an example in which a personal computer is used as such an image synthesis device. The personal computer 100 may receive supply of the above described program via a CD-ROM 101. Or it may also be acceptable to endow the personal computer with a function of connecting to a communication line 104, and to arrange for the personal computer 100 to receive supply of the above described program from a server 103. The communication line 104 may be a communication line such as the internet, a personal computer communication line or the like, or may be a dedicated communication line or the like. The server 103 transmits the program to the personal computer 100 via the communication line 104. In other words, the program is converted into a data signal upon a carrier wave, and this carrier wave is transmitted via the communication line 104. In this manner, the program may be supplied as a computer-readable program product in various formats, such as a recording medium or a carrier wave or the like.

A recording medium 102 is loaded into the personal computer 100 described above. The information recorded upon this recording medium 102 is the image capture information and photographic subject information that is acquired by the digital camera according to the first embodiment executing the photographic processing of the FIG. 8 flow chart, or information of the image signals that are acquired due to the control device 18 of the digital camera according to the second embodiment executing the processing of the step S204 of the FIG. 10 flow chart. By executing the program supplied from the CD-ROM 101 or the server 103, the personal computer 100 reads out this information from the recording medium 102, and then, by executing the image synthesis processing of the FIG. 9 flow chart or the image synthesis processing shown in the steps S15 through S21 of the FIG. 10 flow chart on the basis of this read out information, synthesizes a captured image focused upon the desired image surface position, and displays this captured image upon the display.

The digital camera of the embodiments described above may be of the single lens reflex type, or of some other type. Moreover, instead of the defocus amounts being detected on the basis of the received light signals from the imaging element, it would also be acceptable to arrange for the defocus amounts to be detected by an independent focus detection device using a split pupil phase difference detection method.

The embodiments and variant embodiments explained above are only examples of embodiments of the present invention. Accordingly, in the interpretation of this invention, the correspondence relationship between the elements described above and the elements in the Claims below is not to be considered as imposing any particular limitation. Moreover, provided that its essential concept is not departed from, the present invention should not be considered as being limited in any manner by the details of the embodiments described above.

What is claimed is:

1. An image-capturing device, comprising:
   a micro-lens array in which a plurality of micro lenses are arrayed;
   a plurality of groups of light reception elements respectively corresponding to each of the micro lenses, and that receives a ray bundle that has passed through an optical system via the plurality of micro lenses and outputs a plurality of received light signals corresponding to each of the micro lenses;
   a detection region setting unit that sets a focus detection region for detecting a deviation amount of an image surface within an image of a photographic subject;
   a detection unit that detects the deviation amount of the image surface of the optical system for the focus detection region on the basis of the plurality of received light signals;
   an image creation unit that selects a portion of the plurality of received light signals corresponding to each of the micro lenses on the basis of the deviation amount of an image surface detected by the detection unit for the focus detection region set by the detection region setting unit, and creates an image on the basis of that selected portion of the received light signals;
   a focus adjustment unit that performs focus adjustment of the optical system on the basis of the deviation amount at the image surface detected by the detection unit; and
   a decision making unit that makes a decision as to whether or not the deviation amount of the image surface is less than a predetermined value,
   wherein:
   the image creation unit creates the image on the basis of the received light signals outputted by the light reception element array that has received a ray bundle from the optical system for which focus adjustment has been performed by the focus adjustment unit,
   when the decision making unit makes a decision, that the deviation amount of the image surface is less than a predetermined value, the image creation unit selects a portion of the received light signals from among the received light signals according to each of the micro lenses on the basis of the deviation amount of the image surface detected by the detection unit for the focus detection region set by the detection region setting unit, and
   when the decision making unit makes a decision that the deviation amount of the image surface exceeds the predetermined value, the focus adjustment unit performs focus adjustment of the optical system.

2. The image-capturing device according to claim 1, wherein:
   the specification unit comprises a recognition unit that recognizes a specified image within the image of the photographic subject; and
   the detection unit detects the deviation amount of the image surface at the position of the image recognized by the recognition unit.

3. The image-capturing device according to claim 2, wherein:
   the recognition unit subdivides the image surface by the optical system into a plurality of regions, on the basis of the specified image that has been recognized; and
   the detection unit detects the deviation amounts of the image surface for these regions subdivided by the recognition unit.

4. The image-capturing device according to claim 3, wherein, if the size of any one of the regions subdivided by the recognition unit is greater than a predetermined proportion of the image surface, the detection unit detects a plurality of deviation amounts of the image surface in that region.

5. The image-capturing device according to claim wherein the detection unit detects the deviation amount of the image surface at a position in the image created by the optical system on the basis of the received light signals at which the contrast is greater than a predetermined value.

6. The image-capturing device according to claim 1, further comprising:
   an initial image creation unit that creates an initial image on the basis of a portion of the plurality of received light signals; and
   a selection unit that selects an image of a specified subject from the initial image, wherein
   the detection unit detects, in the initial image, the deviation amount of the image surface at the position of the image of the specified subject.

7. The image-capturing device according to claim 1, wherein the image creation unit determines a selection range when selecting a portion of the received light signals on the basis of the deviation amount of the image surface, according to the aperture value of the optical system.

8. The image-capturing device according to claim 1, wherein the light reception element array outputs the plurality of received light signals in a state in which the optical system is set to fully opened aperture.

9. The image-capturing device according to claim 6, wherein the initial image creation unit creates the initial image on the basis of the received light signals from light reception elements that are positioned at the approximate centers of the groups of light reception elements that respectively correspond to the plurality of micro lenses.

10. The image-capturing device according to claim 6, wherein the detection unit determines a position for detection of the deviation amount of the image surface, on the basis of at least one of the position and the size of an image included in the initial image.

11. The image-capturing device according to claim 10, wherein the detection unit determines a position and size priority order for the image, according to the type of photographic mode.

12. The image-capturing device according to claim 1, further comprising a recording control unit that records image data synthesized by the image creation unit upon a recording medium; and wherein the recording control unit records data for a plurality of images synthesized by the image creation unit on the basis of the plurality of received light signals outputted repeatedly by the light reception element array, on the recording medium as a video image.

13. An image creation method comprising:
   receiving a ray bundle that has passed through an optical system by an image-capturing device, which comprises a micro-lens array and a plurality of groups of light reception elements arranged so as to respectively correspond to each of the micro lenses;

setting a focus detection region for detecting a deviation amount of an image surface within an image of a photographic subject;

detecting the deviation amount of an image surface by the optical system for the focus detection region on the basis of the plurality of received light signals;

capturing the image of the photographic subject by the image-capturing device; and deciding whether or not the deviation amount of the image surface which was detected corresponding to the focus detection region is less than a predetermined value, wherein:

when the decision was made that the deviation amount of the image surface is less than a predetermined value, selecting a portion of the plurality of received light signals corresponding to each of the micro lenses on the basis of the detected deviation amount of the image surface which was detected corresponding to the focus detection region; and creating an image on the basis of that selected portion of the received light signals; and when the decision was made that the deviation amount of the image surface exceeds the predetermined value, performing focus adjustment of the optical system.

14. A non-transitory computer-readable program product for causing a computer to execute:

a step of receiving a ray bundle that has passed through an optical system by an image-capturing device, which comprises a micro-lens array and a plurality of groups of light reception elements arranged so as to respectively correspond to each of the micro lenses;

a step of setting a focus detection region for detecting a deviation amount of an image surface within an image of a photographic subject;

a step of detecting the deviation amount of an image surface by the optical system for the focus detection region on the basis of the plurality of received light signals;

a step of capturing the image of the photographic subject by the image-capturing device; and a step of deciding whether or not the deviation amount of the image surface which was detected corresponding to the focus detection, region is less than a predetermine value wherein:

when the decision was made that the deviation amount of the image surface is less than a predetermined value, a step of selecting a portion of the plurality of received light signals corresponding to each of the micro lenses on the basis of the detected deviation amount of the image surface which was detected corresponding to the focus detection region; and a step of creating an image on the basis of that selected portion of the received light signals: and when the decision was made that the deviation amount of the image surface exceeds the predetermined value, performing focus adjustment of the optical system.

* * * * *